US012784634B2

(12) United States Patent
Moon et al.

(10) Patent No.: US 12,784,634 B2
(45) Date of Patent: Nov. 3, 2026

(54) DISPLAY DEVICE, METHOD OF DRIVING THE SAME, AND ELECTRONIC APPARATUS INCLUDING THE DISPLAY DEVICE

(71) Applicant: Samsung Display Co., LTD., Yongin-si (KR)

(72) Inventors: Gyeong-Ub Moon, Yongin-si (KR); Seunghyun Moon, Yongin-si (KR); Kangbin Jo, Yongin-si (KR); Goeun Cha, Yongin-si (KR); Boram Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/273,797

(22) Filed: Jul. 18, 2025

(65) Prior Publication Data

US 2026/0148673 A1 May 28, 2026

(30) Foreign Application Priority Data

Nov. 27, 2024 (KR) ........................ 10-2024-0172227

(51) Int. Cl.
*G09G 3/20* (2006.01)
*G09G 3/36* (2006.01)

(52) U.S. Cl.
CPC ......... *G09G 3/2074* (2013.01); *G09G 3/3655* (2013.01); *G09G 2300/0452* (2013.01);
(Continued)

(58) Field of Classification Search
CPC ............... G09G 3/2074; G09G 3/3655; G09G 2300/0452; G09G 2310/0232;
(Continued)

(56) References Cited

U.S. PATENT DOCUMENTS 6,633,306 B1 * 10/2003 Marz .................... G09G 3/3607 345/698
8,570,351 B2 * 10/2013 Mori .................... G09G 3/3648 345/88
(Continued)

FOREIGN PATENT DOCUMENTS

KR 20230134025 A 9/2023
KR 20230135221 A 9/2023

*Primary Examiner* — Michael J Jansen, II
(74) *Attorney, Agent, or Firm* — CANTOR COLBURN LLP

(57) ABSTRACT

A display device includes a display panel including first sub-pixels having a first viewing angle and second sub-pixels having a second viewing angle, and a controller which generates output image data including output grayscale values by rendering input image data. An output grayscale value is applied to only the first sub-pixel in a first area, an output grayscale value is applied to only the second sub-pixel in a second area, an output grayscale value is applied to the first and second sub-pixels in a buffer area between the first and second areas, and the output grayscale value applied to the first and second sub-pixels in the buffer area is less than the output grayscale value applied to the first sub-pixel in the first area and the output grayscale value applied to the second sub-pixel in the second area.

20 Claims, 16 Drawing Sheets

(52) U.S. Cl.
CPC ............... *G09G 2310/0232* (2013.01); *G09G 2320/0233* (2013.01); *G09G 2320/0242* (2013.01); *G09G 2320/028* (2013.01); *G09G 2320/068* (2013.01); *G09G 2358/00* (2013.01)

(58) Field of Classification Search
CPC ... G09G 2320/0233; G09G 2320/0242; G09G 2320/028; G09G 2358/00
See application file for complete search history.

(56) References Cited

U.S. PATENT DOCUMENTS

| | | | | |
|---|---|---|---|---|
| 8,687,042 | B2 * | 4/2014 | Karaoguz | H04N 13/315 348/42 |
| 8,810,760 | B2 * | 8/2014 | Yeh | G02F 1/1337 349/129 |
| 8,848,044 | B2 * | 9/2014 | Miyasaka | G09G 5/00 345/421 |
| 8,907,879 | B2 * | 12/2014 | Yoshida | G09G 3/2022 345/208 |
| 9,117,398 | B2 | 8/2015 | Jeong et al. | |
| 9,269,329 | B2 | 2/2016 | Jeong et al. | |
| 9,865,203 | B2 * | 1/2018 | Kim | G09G 3/2022 |
| 10,706,775 | B2 * | 7/2020 | Shin | G09G 3/20 |
| 10,971,059 | B2 * | 4/2021 | Guo | G09G 3/03 |
| 11,289,033 | B2 * | 3/2022 | Lee | G02B 6/0073 |
| 11,558,577 | B2 * | 1/2023 | Chen | H04N 5/44 |
| 11,700,059 | B2 * | 7/2023 | Okamura | G02F 1/0121 345/589 |
| 11,782,309 | B2 * | 10/2023 | Weindorf | G02F 1/133603 349/56 |
| 12,531,003 | B2 * | 1/2026 | Wu | G09G 3/2003 |
| 2008/0180385 | A1 * | 7/2008 | Yoshida | G09G 3/2074 345/87 |
| 2008/0272998 | A1 * | 11/2008 | Yano | G09G 3/2051 345/89 |
| 2008/0284768 | A1 * | 11/2008 | Yoshida | G09G 3/2025 345/208 |
| 2010/0085373 | A1 * | 4/2010 | Miyasaka | H04N 13/341 345/697 |
| 2011/0169913 | A1 * | 7/2011 | Karaoguz | G09G 3/20 348/E13.001 |
| 2011/0254759 | A1 * | 10/2011 | Mori | G09G 3/3614 345/88 |
| 2012/0281174 | A1 * | 11/2012 | Yeh | G02F 1/1337 349/129 |
| 2016/0232860 | A1 * | 8/2016 | Kim | G09G 3/2022 |
| 2019/0005879 | A1 * | 1/2019 | Shin | G09G 3/3233 |
| 2019/0206312 | A1 * | 7/2019 | Guo | G09G 3/03 |
| 2020/0388212 | A1 * | 12/2020 | Okamura | G02F 1/0121 |
| 2021/0020115 | A1 * | 1/2021 | Lee | G02F 1/133 |
| 2022/0038652 | A1 * | 2/2022 | Chen | G09G 3/3685 |
| 2022/0155638 | A1 * | 5/2022 | Weindorf | G02B 30/31 |
| 2023/0230521 | A1 * | 7/2023 | Wu | G09G 3/2003 345/428 |
| 2024/0196649 | A1 * | 6/2024 | Song | G09G 3/3233 |

* cited by examiner

DISPLAY DEVICE, METHOD OF DRIVING THE SAME, AND ELECTRONIC APPARATUS INCLUDING THE DISPLAY DEVICE

This application claims priority to Korean Patent Application No. 10-2024-0172227, filed on Nov. 27, 2024, and all the benefits accruing therefrom under 35 U.S.C. § 119, the content of which in its entirety is herein incorporated by reference.

BACKGROUND

1. Field

Embodiments relate to a display device. More particularly, embodiments relate to a display device that displays an image, a method of driving the display device, and an electronic apparatus including the display device.

2. Description of the Related Art

A display device may include a display panel and a controller. The display panel may include pixels, and each of the pixels may include sub-pixels. The controller may generate output image data including output grayscale values applied to the sub-pixels by rendering input image data including input grayscale values.

A display area of the display device on which an image is displayed may include a normal area that displays an image having a relatively wide viewing angle and a private area that displays an image having a relatively narrow viewing angle. The image displayed in the normal area may be viewed from a front of an electronic apparatus including the display device as well as from a side of the electronic apparatus. The image displayed in the private area may be viewed only from the front of the electronic apparatus, and may not be viewed from the side of the electronic apparatus.

SUMMARY

Embodiments provide a display device in which a visibility at a boundary between a normal area and a private area is reduced and an electronic apparatus including the display device.

Embodiments provide a method of driving a display device for reducing a visibility at a boundary between a normal area and a private area.

A display device in embodiments includes a display panel including first pixels including first sub-pixels having a first viewing angle and second pixels including second sub-pixels having a second viewing angle different from the first viewing angle, and a controller which generates output image data including output grayscale values applied to the first and second sub-pixels of the display panel by rendering input image data including input grayscale values. An output grayscale value of the output grayscale values is applied to only the first sub-pixel in a first area among the first sub-pixels, an output grayscale value of the output grayscale values is applied to only the second sub-pixel in a second area among the second sub-pixels, an output grayscale value of the output grayscale values is applied to the first sub-pixel and the second sub-pixel in a buffer area between the first area and the second area among the first sub-pixels and the second sub-pixels, and when the input grayscale values of the first sub-pixels and the second sub-pixels, respectively, are the same as each other, the output grayscale value applied to the first sub-pixel and the second sub-pixel disposed in the buffer area is less than the output grayscale value applied to the first sub-pixel disposed in the first area and the output grayscale value applied to the second sub-pixel disposed in the second area.

In an embodiment, the output grayscale value may be applied to an entirety of first sub-pixels included in the first pixels next (adjacent) to a first boundary between the first area and the buffer area, and the output grayscale value may be applied to an entirety of second sub-pixels included in the second pixels next (adjacent) to a second boundary between the second area and the buffer area.

In an embodiment, the output grayscale value may be applied to an entirety of first sub-pixels included in the first pixels disposed between the first boundary and the second boundary in a first direction.

In an embodiment, the output grayscale value may be applied to the entirety of first sub-pixels included in the first pixels disposed between the first boundary and the second boundary in a second direction perpendicular to the first direction.

In an embodiment, the output grayscale value may be applied to the entirety of first sub-pixels included in the first pixels disposed between the first boundary and the second boundary in a third direction between the first direction and the second direction.

In an embodiment, when the input grayscale values of the first sub-pixels and the second sub-pixels, respectively, are the same as each other, the output grayscale value applied to the first sub-pixel disposed in the first area and the second sub-pixel disposed in the second area may decrease toward the buffer area.

In an embodiment, the output grayscale value may not be applied to some sub-pixels among an entirety of first sub-pixels and an entirety of second sub-pixels disposed in the buffer area.

In an embodiment, the output grayscale value may be applied to an entirety of first sub-pixels and an entirety of second sub-pixels disposed in the buffer area.

In an embodiment, each of the first pixels and the second pixels may include one red sub-pixel which displays red, two green sub-pixels which display green, and one blue sub-pixel which displays blue.

A method of driving a display device in embodiments includes receiving input image data including input grayscale values, generating output image data including output grayscale values applied to first sub-pixels and second sub-pixels of a display panel by rendering the input image data such that an output grayscale value of the output grayscale values is applied to only a first sub-pixel included in first pixels having a first viewing angle in a first area among the first sub-pixels, an output grayscale value of the output grayscale values is applied to only a second sub-pixel included in second pixels having a second viewing angle different from the first viewing angle in a second area among the second sub-pixels, and an output grayscale value of the output grayscale values is applied to the first sub-pixel and the second sub-pixel in a buffer area between the first area and the second area among the first and second sub-pixels, and displaying an image based on the output image data. When the input grayscale values of the first sub-pixels and the second sub-pixels, respectively, are the same as each other, the output grayscale value applied to the first sub-pixel and the second sub-pixel disposed in the buffer area is less than the output grayscale value applied to the first sub-pixel disposed in the first area and the output grayscale value applied to the second sub-pixel disposed in the second area.

In an embodiment, the output grayscale value may be applied to an entirety of first sub-pixels included in the first pixels next (adjacent) to a first boundary between the first area and the buffer area, and the output grayscale value may be applied to an entirety of second sub-pixels included in the second pixels next (adjacent) to a second boundary between the second area and the buffer area.

In an embodiment, the output grayscale value may be applied to an entirety of first sub-pixels included in the first pixels disposed between the first boundary and the second boundary in a first direction.

In an embodiment, the output grayscale value may be applied to the entirety of first sub-pixels included in the first pixels disposed between the first boundary and the second boundary in a second direction perpendicular to the first direction.

In an embodiment, the output grayscale value may be applied to the entirety of first sub-pixels included in the first pixels disposed between the first boundary and the second boundary in a third direction between the first direction and the second direction.

In an embodiment, when the input grayscale values of the first sub-pixels and the second sub-pixels, respectively, are the same as each other, the output grayscale value applied to the first sub-pixel disposed in the first area and the output grayscale value applied to the second sub-pixel disposed in the second area may be the same as each other.

In an embodiment, when the input grayscale values of the first sub-pixels and the second sub-pixels, respectively, are the same as each other, the output grayscale value applied to the first sub-pixel disposed in the first area and the second sub-pixel disposed in the second area may decrease toward the buffer area.

In an embodiment, the output grayscale value may not be applied to a first sub-pixel or a second sub-pixel among an entirety of first sub-pixels and an entirety of second sub-pixels disposed in the buffer area.

In an embodiment, the output grayscale value may be applied to an entirety of first sub-pixels and an entirety of second sub-pixels disposed in the buffer area.

An electronic apparatus in embodiments includes a display device which displays an image, and a processor which provides input image data including input grayscale values to the display device. The display device includes a display panel including first pixels including first sub-pixels having a first viewing angle and second pixels including second sub-pixels having a second viewing angle different from the first viewing angle, and a controller which generates output image data including output grayscale values applied to a sub-pixel of the display panel by rendering the input image data. An output grayscale value of the output grayscale values is applied to only a first sub-pixel in a first area among the first sub-pixels, an output grayscale value of the output grayscale values is applied to only a second sub-pixel in a second area among the second sub-pixels, an output grayscale value of the output grayscale values is applied to a first sub-pixel and a second sub-pixel in a buffer area between the first area and the second area among the first sub-pixels and the second sub-pixels, and when the input grayscale values of the first sub-pixels and the second sub-pixels, respectively, are the same as each other, the output grayscale value applied to the first sub-pixel and the second sub-pixel disposed in the buffer area is less than the output grayscale value applied to the first sub-pixel disposed in the first area and the output grayscale value applied to the second sub-pixel disposed in the second area.

In the display device, the method of driving the display device, and the electronic apparatus in the embodiments, the output grayscale value applied to the sub-pixels disposed in the buffer area between the normal area and the private area is less than the output grayscale value applied to the sub-pixels disposed in the normal area and the output grayscale value applied to the sub-pixels disposed in the private area, so that the sub-pixels disposed in the buffer area may emit light with a relatively low luminance. Accordingly, color difference at the boundary between the normal area and the private area may decrease, and the visibility at the boundary between the normal area and the private area may be reduced.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
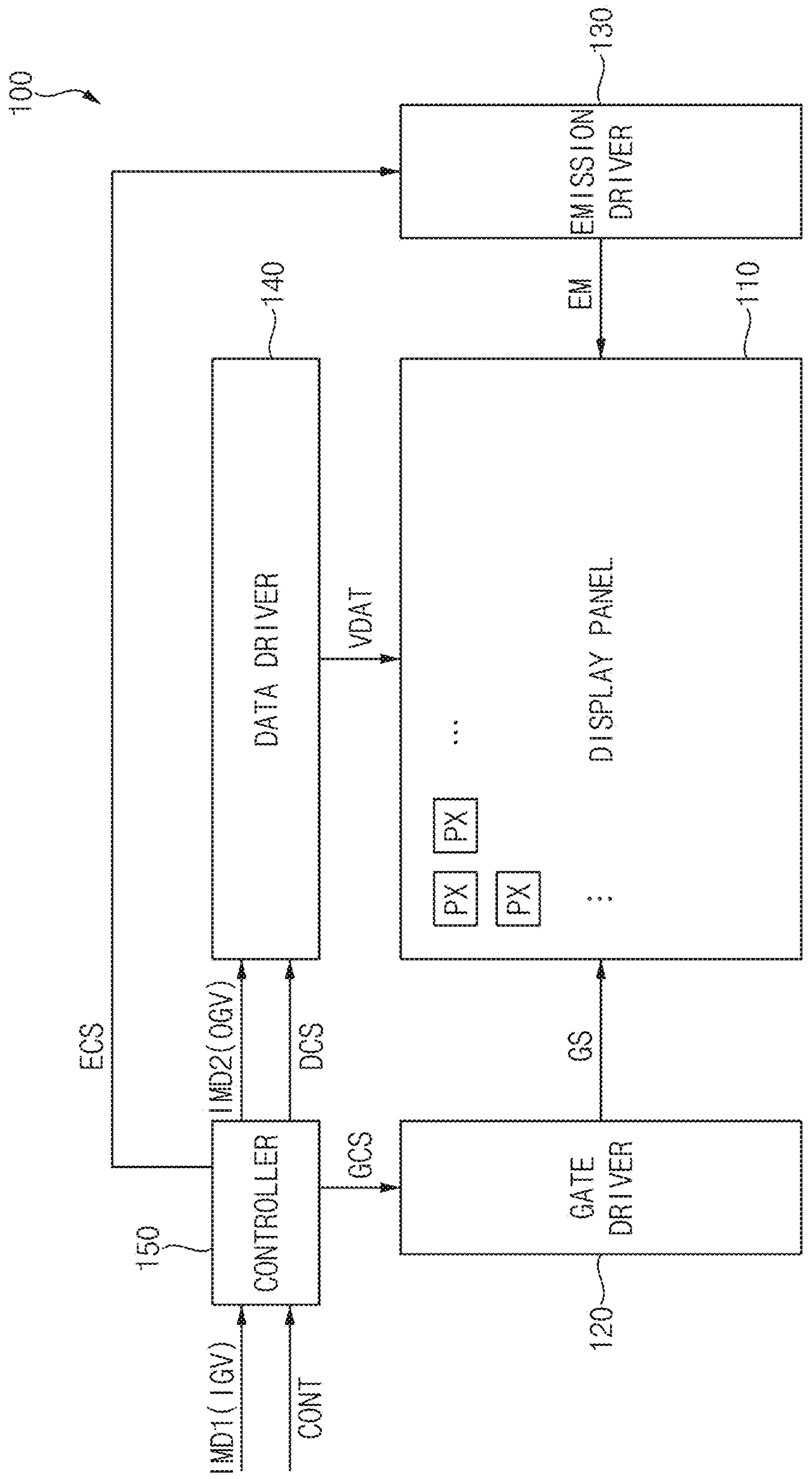
FIG. 1 is a block diagram illustrating an embodiment of a display device.

Hereinafter, a display device, a method of driving a display device, and an electronic apparatus in embodiments of the disclosure will be described in more detail with reference to the accompanying drawings. The same or similar reference numerals will be used for the same elements in the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," may therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" may, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device 100.

Referring to FIG. 1, the display device 100 may include a display panel 110, a gate driver 120, an emission driver 130, a data driver 140, and a controller 150.

The display panel 110 may include a plurality of pixels PX. Each of the pixels PX may include a plurality of sub-pixels.

The gate driver 120 may provide gate signals GS to the sub-pixels. The gate driver 120 may generate the gate signals GS based on a gate control signal GCS. The gate control signal GCS may include a gate clock signal and a gate start signal.

The emission driver 130 may provide emission signals EM to the sub-pixels. The emission driver 130 may generate the emission signals EM based on an emission control signal ECS. The emission control signal ECS may include an emission clock signal and an emission start signal.

The data driver 140 may provide data voltages VDAT to the sub-pixels. The data driver 140 may generate the data voltages VDAT based on output image data IMD2 and a data control signal DCS. The output image data IMD2 may include output grayscale values OGV applied to the sub-pixels. The data driver 140 may convert the output grayscale values OGV in digital format into the data voltages VDAT in analog format. The data control signal DCS may include a data clock signal, a load signal, and an output data enable signal.

The controller 150 may control the gate driver 120, the emission driver 130, and the data driver 140. The controller 150 may provide the gate control signal GSC to the gate driver 120, may provide the emission control signal ESC to the emission driver 130, and may provide the output image data IMD2 and the data control signal DSC to the data driver 140. The controller 150 may generate the output image data IMD2, the gate control signal GSC, the emission control signal ESC, and the data control signal DSC based on input image data IMD1 and a control signal CONT. The input image data IMD1 may include input grayscale values IGV corresponding to the sub-pixels. The controller 150 may generate the output image data IMD2 by rendering the input image data IMD1. The control signal CONT may include a master clock signal, a vertical synchronization signal, a horizontal synchronization signal, and an input data enable signal.

Figure 2:
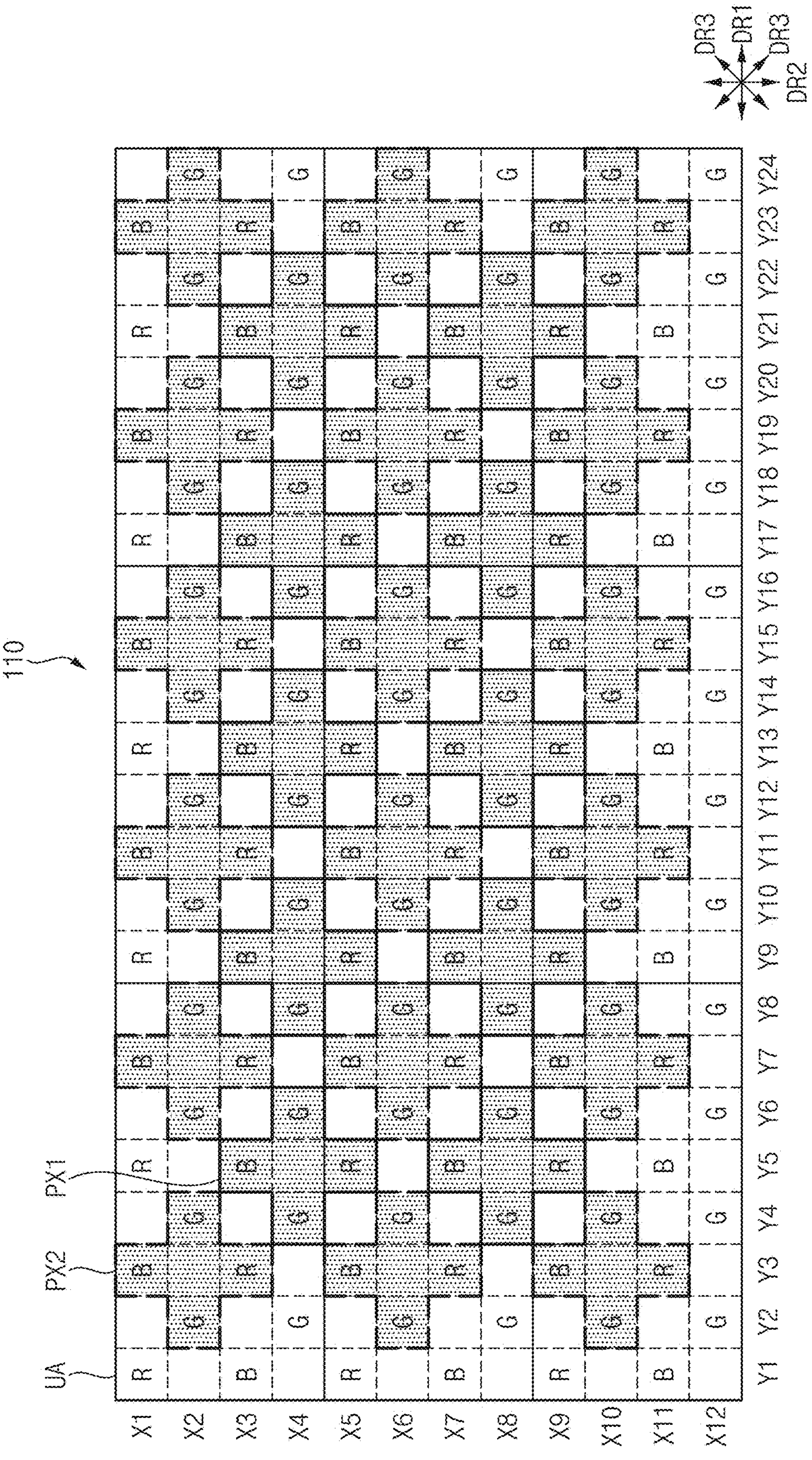
FIG. 2 is a plan view illustrating pixels included in a display panel.

FIG. 2 is a plan view illustrating pixels PX1 and PX2 included in the display panel 110. In an embodiment, FIG. 2 illustrates first to twelfth sub-pixel rows X1-X12 and first to twenty-fourth sub-pixel columns Y1-Y24 of the display panel 110, for example.

Referring to FIGS. 1 and 2, the display panel 110 may include first pixels PX1 and second pixels PX2. The first pixel PX1 may include first sub-pixels having a first viewing angle, and the second pixel PX2 may include second sub-pixels having a second viewing angle. The second viewing angle may be narrower than the first viewing angle. In this case, the first sub-pixel may be a wide viewing angle sub-pixel, and the second sub-pixel may be a narrow viewing angle sub-pixel.

In an embodiment, each of the first pixel PX1 and the second pixel PX2 may include one red sub-pixel R that displays red, two green sub-pixels G that display green, and one blue sub-pixel B that displays blue. In an embodiment, in one pixel, the green sub-pixels G may be disposed in a first direction DR1 from a center of the pixel with the center of the pixel interposed therebetween, and the red sub-pixel R and the blue sub-pixel B may be disposed in a second direction DR2 from the center of the pixel with the center of the pixel interposed therebetween. The second direction DR2 may be perpendicular to the first direction DR1. In an embodiment, the first direction DR1 may be a horizontal direction, and the second direction DR2 may be a vertical direction, for example.

In an embodiment, the red sub-pixel R of the first pixel PX1 may be disposed in a $4n-3^{th}$ (n is a natural number greater than or equal to 1) sub-pixel row and a $4m-3^{th}$ (m is a natural number greater than or equal to 1) sub-pixel column, the green sub-pixel G of the first pixel PX1 may be disposed in a $4n^{th}$ sub-pixel row and a $2m^{th}$ sub-pixel column, and the blue sub-pixel B of the first pixel PX1 may be disposed in a $4n-1^{th}$ sub-pixel row and a $4m-3^{th}$ sub-pixel column. Further, the red sub-pixel R of the second pixel PX2 may be disposed in the $4n-1^{th}$ sub-pixel row and a $4m-1^{th}$ sub-pixel column, the green sub-pixel G of the second pixel PX2 may be disposed in a $4n-2^{th}$ sub-pixel row and the $2m^{th}$ sub-pixel column, and the blue sub-pixel B of the second pixel PX2 may be disposed in the $4n-3^{th}$ sub-pixel row and the $4m-1^{th}$ sub-pixel column. In this case, the red sub-pixels R of the first pixel PX1 and the blue sub-pixels B of the second pixel PX2 may be alternately arranged in the same sub-pixel row along the first direction DR1, the green sub-pixels G of the first pixel PX1 and the green sub-pixels G of the second pixel PX2 may be alternately arranged in the same sub-pixel column along the second direction DR2, and the blue sub-pixels B of the first pixel PX1 and the red sub-pixels R of the second pixel PX2 may be alternately arranged in the same sub-pixel row along the first direction DR1. Further, four second pixels PX2 surrounding one first pixel PX1 may be positioned in a third direction DR3 between the first direction DR1 and the second direction DR2 from the first pixel PX1. The third direction DR3 may be a diagonal direction intersecting the horizontal direction and the vertical direction.

The display panel 110 may be divided into unit areas UA arranged in the first direction DR1 and the second direction DR2. The controller 150 may generate the output image data IMD2 by rendering the input image data IMD1 for each unit area UA. A plurality of sub-pixels may be arranged in one unit area UA. In one unit area UA, the red sub-pixels R and the blue sub-pixels B may be arranged in odd sub-pixel rows and odd sub-pixel columns, and the green sub-pixels G may be arranged in even sub-pixel rows and even sub-pixel columns. In an embodiment, in a unit area UA disposed in the first to fourth sub-pixel rows X1-X4 and the first to eighth sub-pixel columns Y1-Y8 of FIG. 2, the red sub-pixels R and the blue sub-pixels B may be positioned in the first and third sub-pixel rows X1 and X3 and the first, third, fifth, and seventh sub-pixel columns Y1, Y3, Y5, and Y7, and the green sub-pixels G may be positioned in the second and fourth sub-pixel rows X2 and X4 and the second, fourth, sixth, and eighth sub-pixel columns Y2, Y4, Y6, and Y8, for example.

Figure 3:
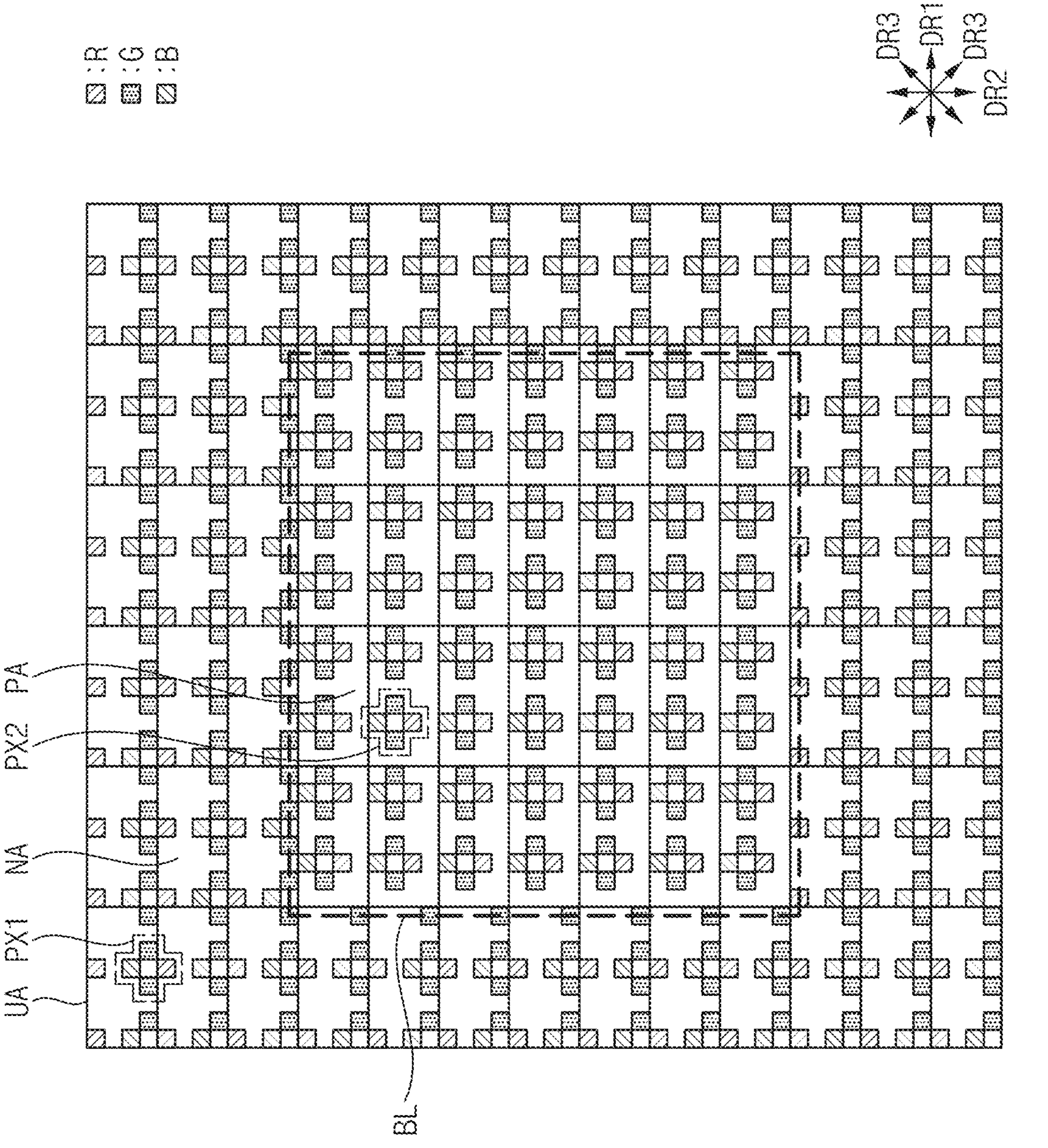
FIG. 3 is a diagram illustrating output image data according to the prior art.
Figure 4:
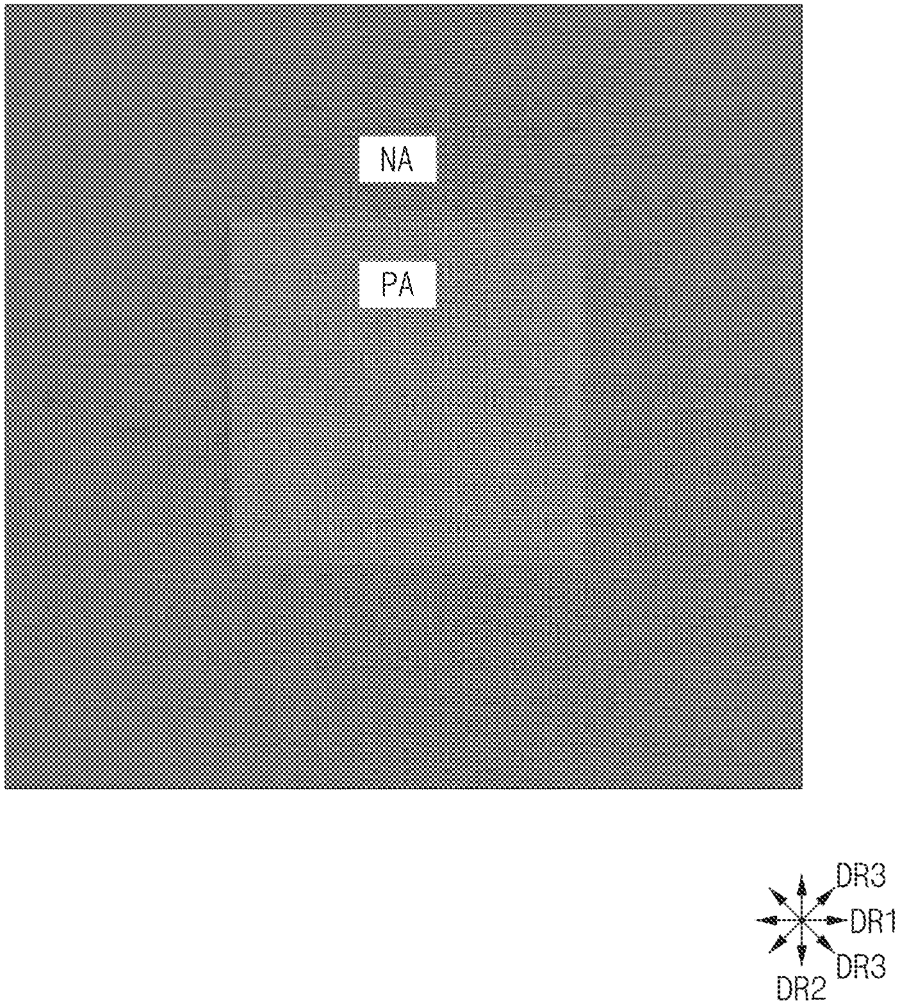
FIG. 4 is a diagram illustrating an image displayed according to the output image data of FIG. 3.

FIG. 3 is a diagram illustrating output image data IMD2 according to the prior art. FIG. 4 is a diagram illustrating an image displayed according to the output image data IMD2 of FIG. 3. FIG. 3 illustrates sub-pixels to which output grayscale values OGV are applied among an entirety of sub-pixels.

Referring to FIGS. 1 to 4, the display panel 110 may include a first area (or normal area) NA driven in a first mode (or normal mode) and a second area (or private area) PA driven in a second mode (or private mode). The positions of the normal area NA and the private area PA within the display panel 110 may be determined by a user's setting or an image displayed by the display panel 110.

In the normal area NA, the output grayscale value OGV may be applied only to the first sub-pixels of the first pixel PX1 having the first viewing angle which is a wide viewing angle. Accordingly, the image displayed in the normal area NA may be viewed not only from a front of an electronic apparatus 1000 of FIG. 16 including the display device 100 but also from a side of the electronic apparatus 1000.

In the private area PA, the output grayscale value OGV may be applied only to the second sub-pixels of the second pixel PX2 having the second viewing angle, which is a narrow viewing angle. Accordingly, the image displayed in the private area PA may be viewed only from the front of the electronic apparatus 1000, and may not be viewed from the side of the electronic apparatus 1000.

The output grayscale value OGV may not be applied to some sub-pixels among an entirety of sub-pixels included in the pixel next (adjacent) to a boundary BL between the normal area NA and the private area PA. In an embodiment, in a first pixel PX1 next (adjacent) to an upper side of the boundary BL, the output grayscale value OGV may be applied to the green sub-pixels G and the blue sub-pixel B, and the output grayscale value OGV may not be applied to the red sub-pixel R, for example. Accordingly, a cyan horizontal line may be displayed on the upper side of the boundary BL. In an embodiment, in a first pixel PX1 next (adjacent) to a lower side of the boundary BL, the output grayscale value OGV may be applied to the red sub-pixel R, and the output grayscale value OGV may not be applied to the green sub-pixels G and the blue sub-pixel B, for example. Accordingly, a red horizontal line may be displayed on the lower side of the boundary BL. In an embodiment, in a first pixel PX1 next (adjacent) to a left side of the boundary BL, the output grayscale value OGV may be applied to one green sub-pixel G, and the output grayscale value OGV may not be applied to the red sub-pixel R, another green sub-pixel G, and the blue sub-pixel B, for example. Accordingly, a green vertical line may be displayed on the left side of the boundary BL. In an embodiment, in a first pixel PX1 next (adjacent) to a right side of the boundary BL, the output grayscale value OGV may be applied to the red sub-pixel R, one green sub-pixel G, and the blue sub-pixel B, and the output grayscale value OGV may not be applied to another green sub-pixel G, for example. Accordingly, a magenta vertical line may be displayed on the right side of the boundary BL. Therefore, luminance difference and color difference may occur at the boundary BL between the normal area NA and the private area PA, and the boundary BL between the normal area NA and the private area PA may be recognized.

Figure 5:
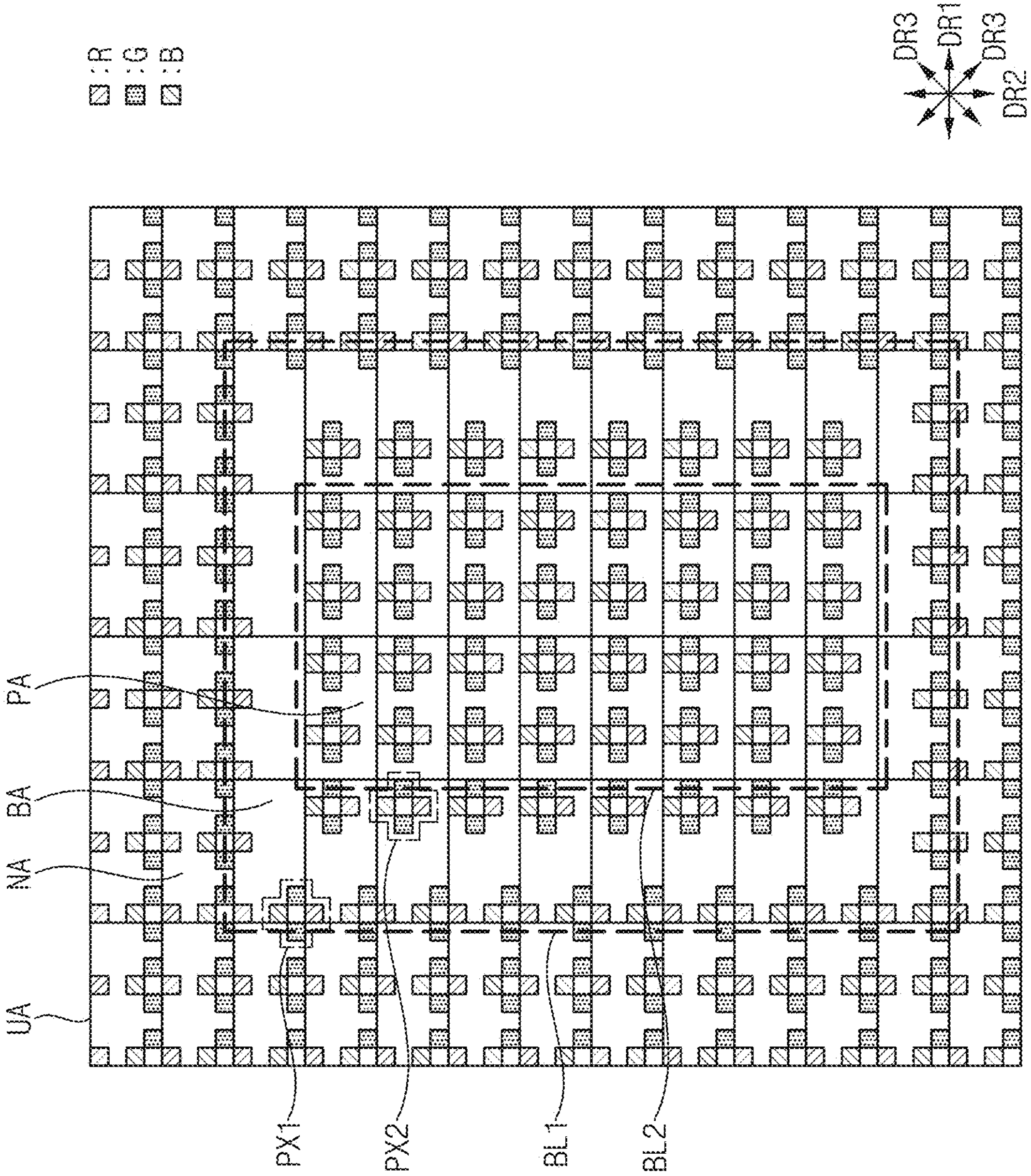
FIG. 5 is a diagram illustrating an embodiment of output image data in a first operation.
Figure 6:
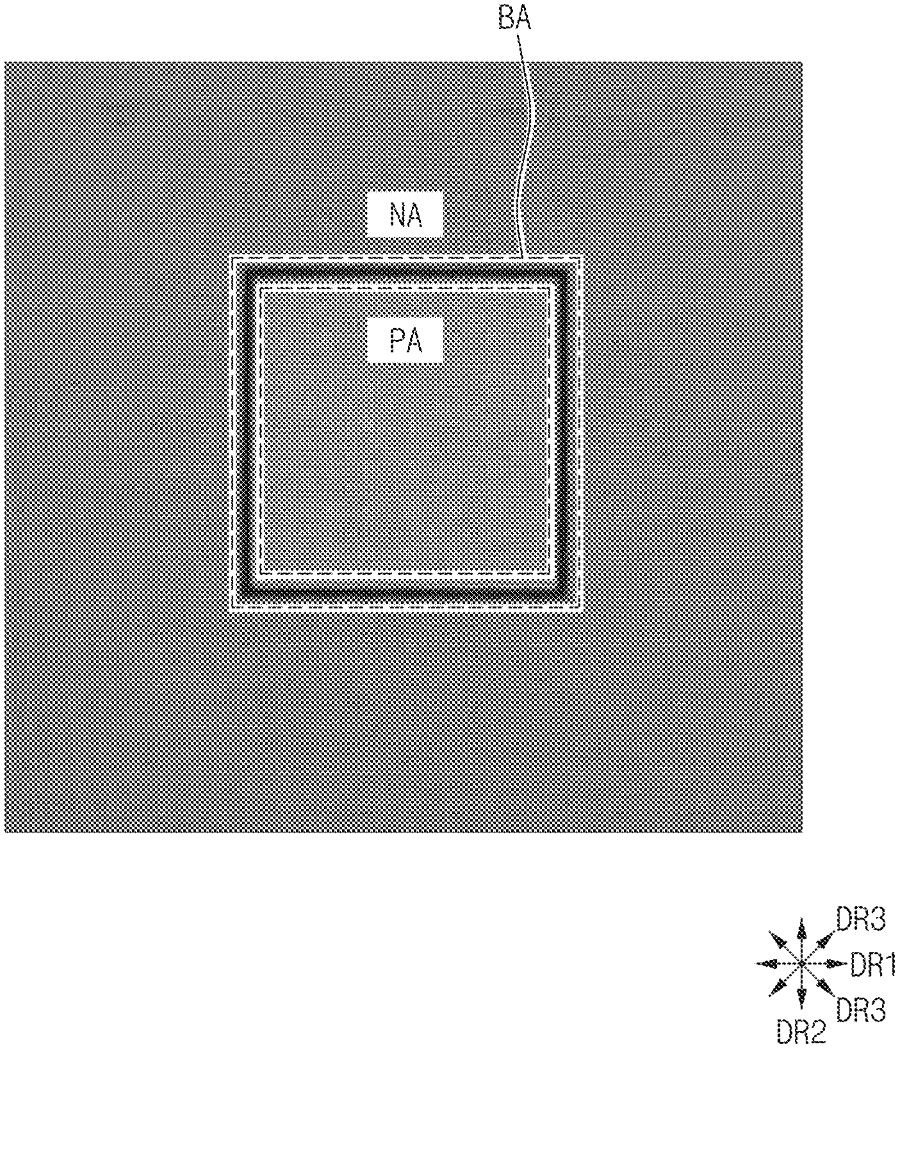
FIG. 6 is a diagram illustrating an image displayed according to the output image data of FIG. 5.
Figure 7:
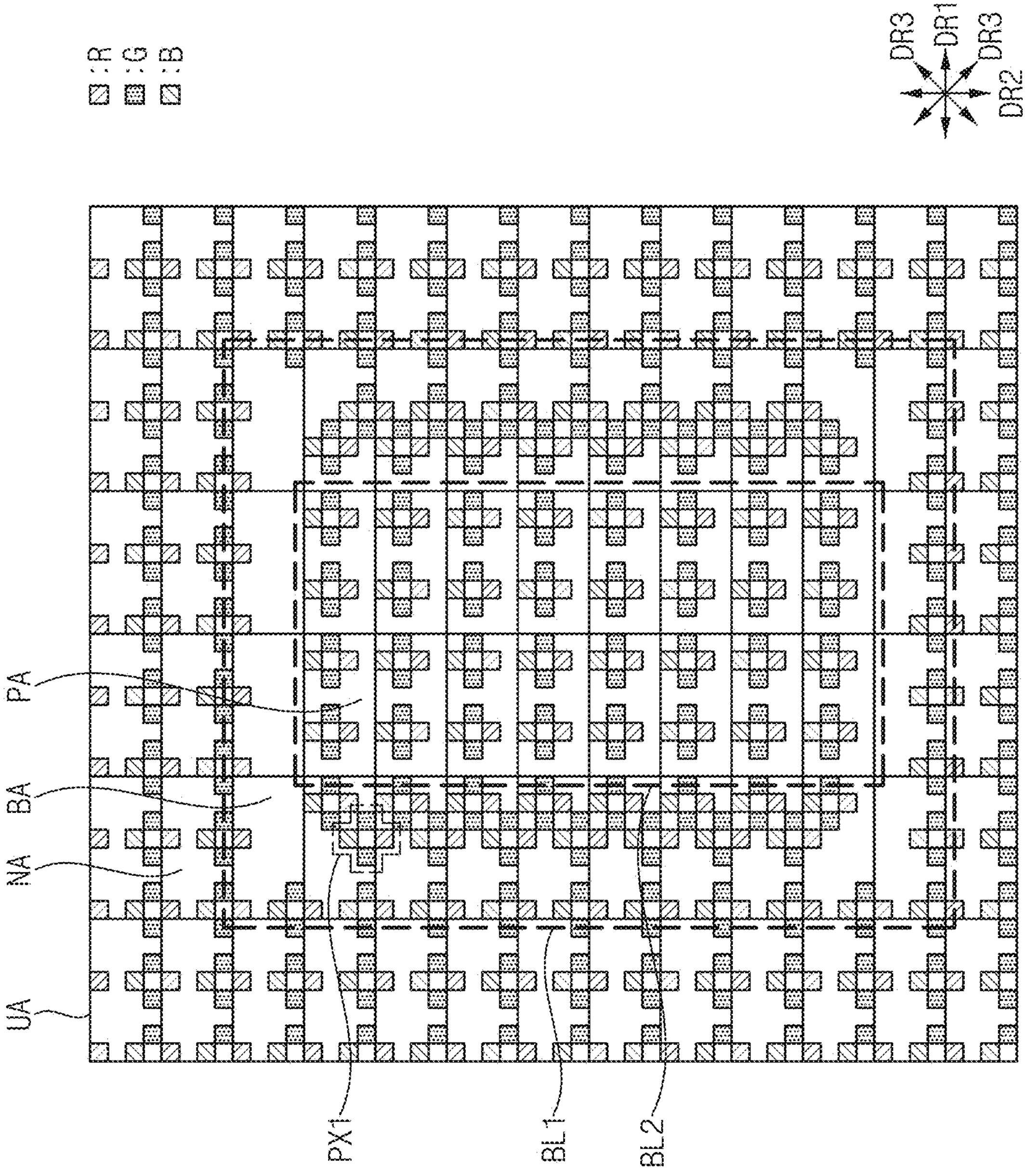
FIG. 7 is a diagram illustrating an embodiment of output image data in a second operation.
Figure 8:
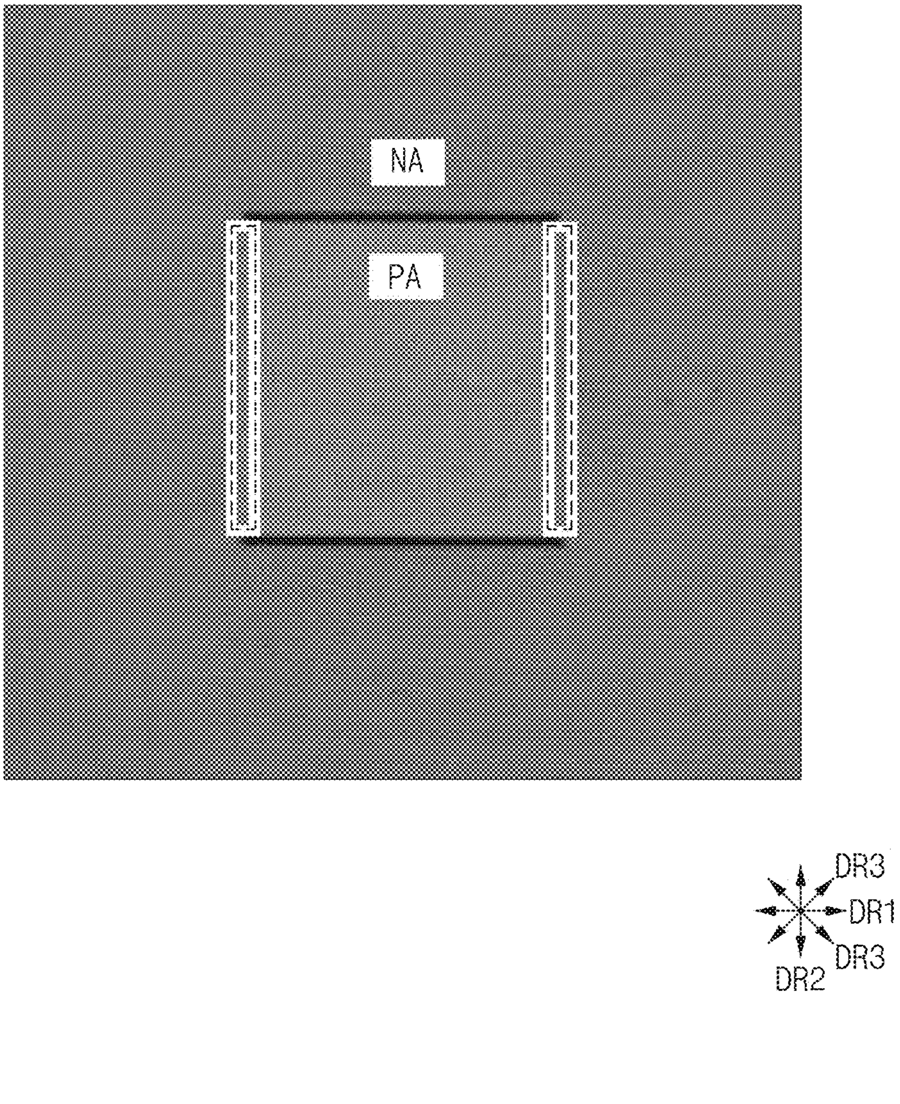
FIG. 8 is a diagram illustrating an image displayed according to the output image data of FIG. 7.
Figure 9:
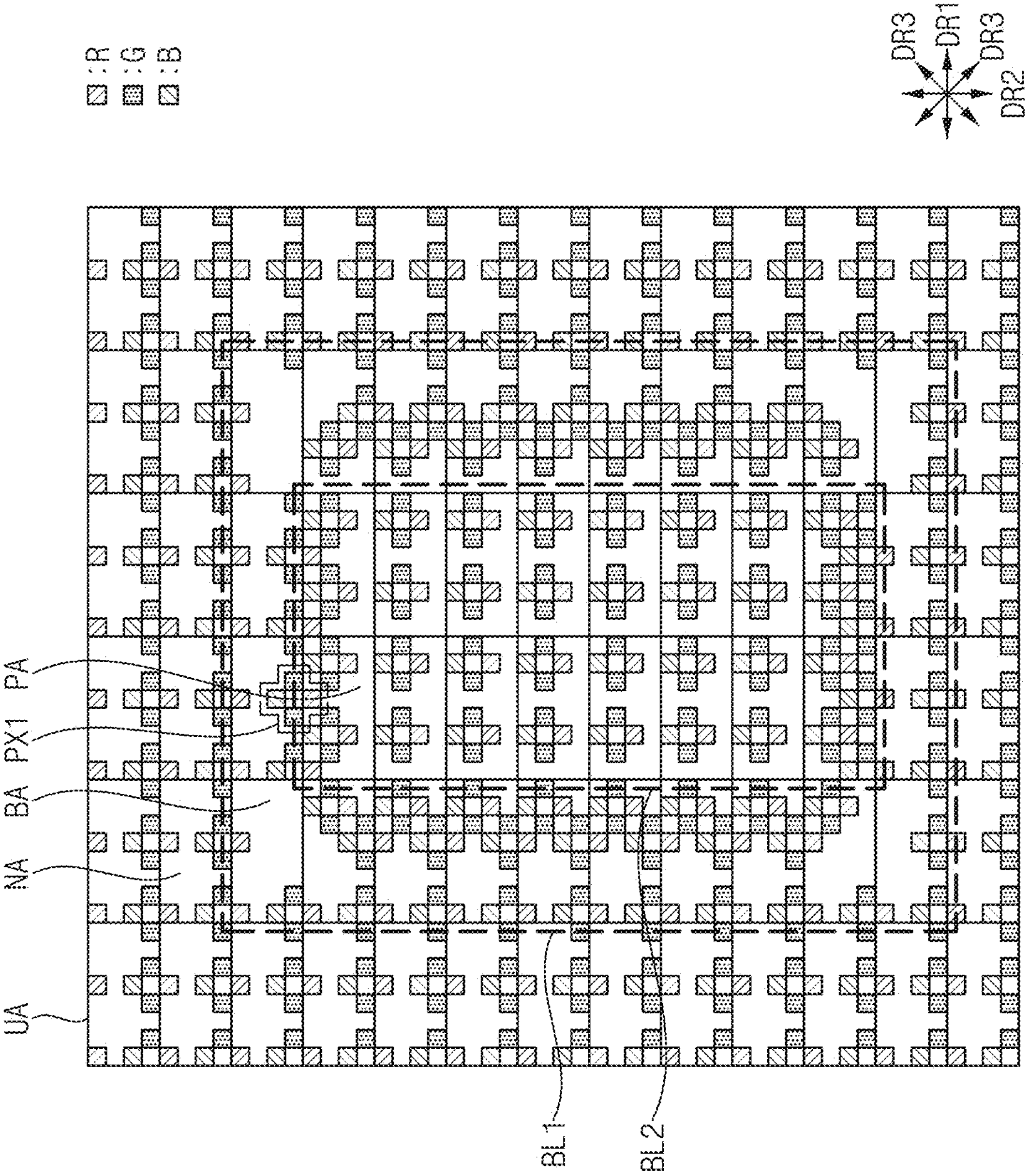
FIG. 9 is a diagram illustrating an embodiment of output image data in a third operation.
Figure 10:
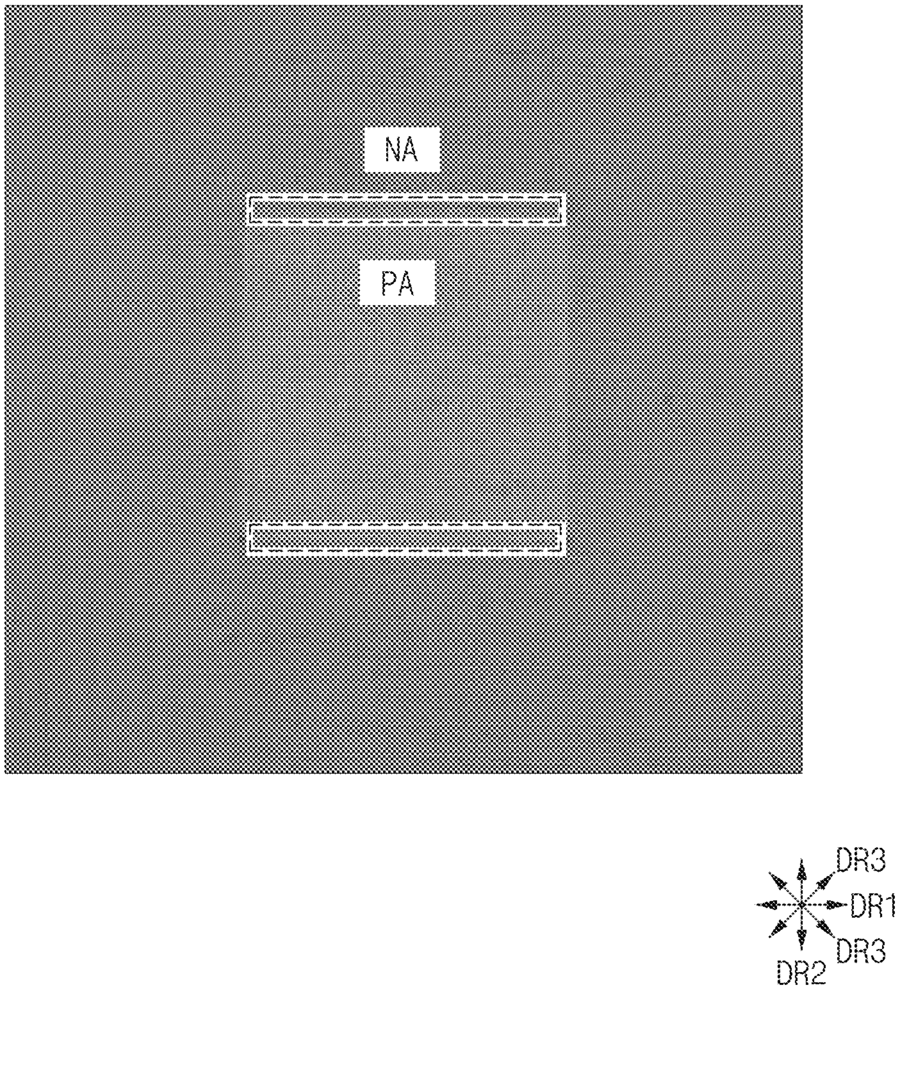
FIG. 10 is a diagram illustrating an image displayed according to the output image data of FIG. 9.
Figure 11:
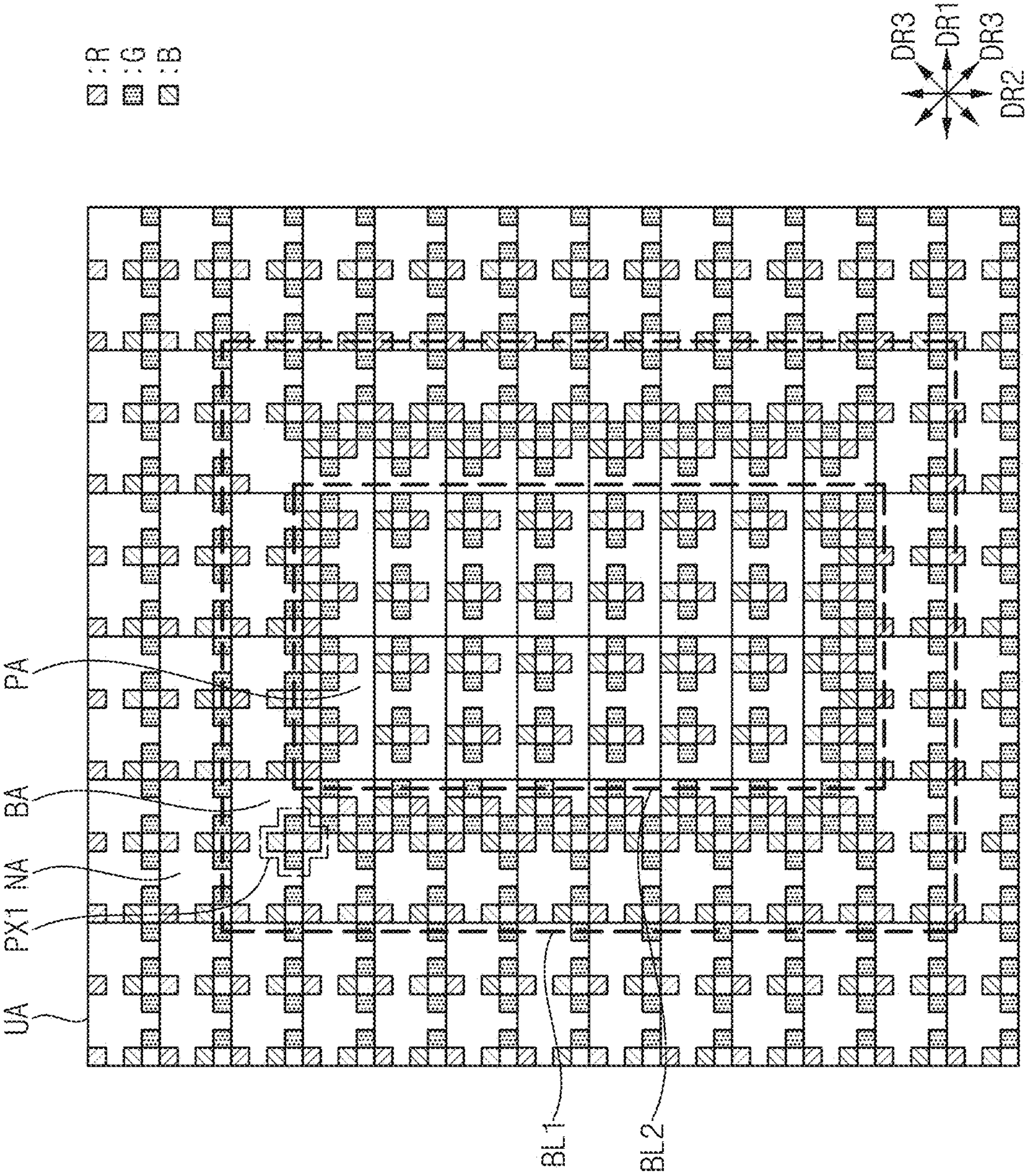
FIG. 11 is a diagram illustrating an embodiment of output image data in a fourth operation.
Figure 12:
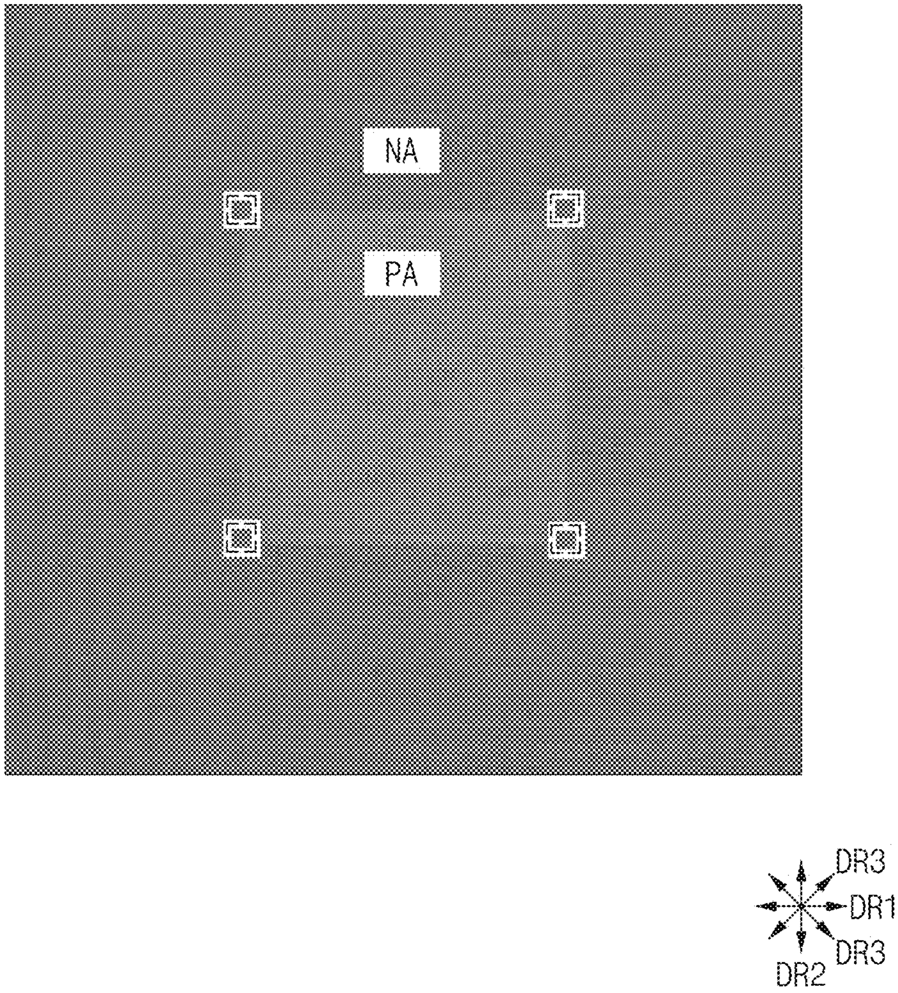
FIG. 12 is a diagram illustrating an image displayed according to the output image data of FIG. 11.

FIGS. 5 to 12 are diagrams for describing an embodiment in which the controller 150 generates the output image data IMD2 by sequentially rendering the input image data IMD1 over four operations. FIG. 5 is a diagram illustrating an embodiment of output image data IMD2 in a first operation. FIG. 6 is a diagram illustrating an image displayed according to the output image data IMD2 of FIG. 5. FIG. 7 is a diagram illustrating an embodiment of output image data IMD2 in a second operation. FIG. 8 is a diagram illustrating an image displayed according to the output image data IMD2 of FIG. 7. FIG. 9 is a diagram illustrating an embodiment of output image data IMD2 in a third operation. FIG. 10 is a diagram illustrating an image displayed according to the output image data IMD2 of FIG. 9. FIG. 11 is a diagram illustrating an embodiment of output image data IMD2 in a fourth operation. FIG. 12 is a diagram illustrating an image displayed according to the output image data IMD2 of FIG. 11. FIGS. 5, 7, 9, and 11 illustrate sub-pixels to which output grayscale values OGV are applied among an entirety of sub-pixels.

Referring to FIGS. 1, 2, and 5 to 12, in order to prevent the boundary between the normal area NA and the private area PA from being recognized, the output grayscale value OGV may be applied to the first sub-pixels and the second sub-pixels in a buffer area BA between the normal area NA and the private area PA. The buffer area BA may be disposed between the normal area NA and the private area PA.

As illustrated in FIG. 5, in the first stage, in the normal area NA, the output grayscale value OGV may be applied only to the first sub-pixels, and the output grayscale value OGV may not be applied to the second sub-pixels. In the private area PA, the output grayscale value OGV may be applied only to the second sub-pixels, and the output grayscale value OGV may not be applied to the first sub-pixels.

In the first stage, the output grayscale value OGV may be applied to an entirety of first sub-pixels (one red sub-pixel R, two green sub-pixels G, and one blue sub-pixel B) included in each of the first pixels PX1 next (adjacent) to a first boundary BL1 between the normal area NA and the buffer area BA, and the output grayscale value OGV may be applied to an entirety of second sub-pixels (one red sub-pixel R, two green sub-pixels G, and one blue sub-pixel B) included in each of the second pixels PX2 next (adjacent) to a second boundary BL2 between the private area PA and the buffer area BA. Accordingly, the output grayscale value OGV may be applied to an entirety of sub-pixels of each of the pixels next (adjacent) to the first boundary BL1 and the second boundary BL2.

As illustrated in FIG. 6, the output grayscale value OGV is applied to the entirety of the sub-pixels of each of the pixels next (adjacent) to the first boundary BL1 and the second boundary BL2, so that color difference may not occur in the buffer area BA. However, the output grayscale value OGV is not yet applied to the first sub-pixels and the second sub-pixels disposed between the first pixels PX1 next (adjacent) to the first boundary BL1 and the second pixels PX2 next (adjacent) to the second boundary BL2 in the first operation, so that a black square frame may be displayed in the buffer area BA.

As illustrated in FIG. 7, in the second operation, the output grayscale value OGV may be applied to an entirety of first sub-pixels included in each of the first pixels PX1 disposed between the first boundary BL1 and the second boundary BL2 in the first direction DR1. In an embodiment, the output grayscale value OGV may be applied to an entirety of first sub-pixels of each of the first pixels PX1 disposed in a portion of the buffer area BA next (adjacent) to a left side of the private area PA and a portion of the buffer area BA next (adjacent) to a right side of the private area PA, for example. When the input grayscale values IGV of the first sub-pixels and the second sub-pixels, respectively, are the same as each other, the output grayscale value OGV applied to the first sub-pixels and the second sub-pixels disposed in a portion of the buffer area BA between the first boundary BL1 and the second boundary BL2 in the first direction DR1 may be less than the output grayscale value OGV applied to the first sub-pixels disposed in the normal area NA and the output grayscale value OGV applied to the second sub-pixels disposed in the private area PA.

As illustrated in FIG. 8, the output grayscale value OGV is applied to the entirety of the first sub-pixels of each of the first pixels PX1 disposed between the first boundary BL1 and the second boundary BL2 in the first direction DR1, so that the vertical lines of the black square frame displayed in the buffer area BA may be removed. Accordingly, the visibility at the boundary between the normal area NA and the private area PA in the first direction DR1 may be reduced.

As illustrated in FIG. 9, in the third operation, the output grayscale value OGV may be applied to an entirety of first sub-pixels included in each of the first pixels PX1 disposed between the first boundary BL1 and the second boundary BL2 in the second direction DR2. In an embodiment, the output grayscale value OGV may be applied to an entirety of first sub-pixels of each of the first pixels PX1 disposed in a portion of the buffer area BA next (adjacent) to an upper side of the private area PA and a portion of the buffer area BA next (adjacent) to a lower side of the private area PA. When the input grayscale values IGV of the first sub-pixels and the second sub-pixels, respectively, are the same as each other, the output grayscale value OGV applied to the first sub-pixels and the second sub-pixels disposed in a portion of the buffer area BA between the first boundary BL1 and the second boundary BL2 in the second direction DR2 may be less than the output grayscale value OGV applied to the first sub-pixels disposed in the normal area NA and the output grayscale value OGV applied to the second sub-pixels disposed in the private area PA, for example.

As illustrated in FIG. 10, the output grayscale value OGV is applied to the entirety of the first sub-pixels of each of the first pixels PX1 disposed between the first boundary BL1 and the second boundary BL2 in the second direction DR2, so that the horizontal lines of the black square frame displayed in the buffer area BA may be removed. Accordingly, the visibility at the boundary between the normal area NA and the private area PA in the second direction DR2 may be reduced.

As illustrated in FIG. 11, in the fourth operation, the output grayscale value OGV may be applied to an entirety of first sub-pixels included in each of the first pixels PX1 disposed between the first boundary BL1 and the second boundary BL2 in the third direction DR3. In an embodiment, the output grayscale value OGV may be applied to an entirety of first sub-pixels of each of the first pixels PX1 disposed in portions of the buffer area BA next (adjacent) to corners of the private area PA, for example. When the input grayscale values IGV of the first sub-pixels and the second sub-pixels, respectively, are the same as each other, the output grayscale value OGV applied to the first sub-pixels and the second sub-pixels disposed in a portion of the buffer area BA between the first boundary BL1 and the second boundary BL2 in the third direction DR3 may be less than the output grayscale value OGV applied to the first sub-pixels disposed in the normal area NA and the output grayscale value OGV applied to the second sub-pixels disposed in the private area PA.

As illustrated in FIG. 12, the output grayscale value OGV is applied to the entirety of the first sub-pixels of each of the first pixels PX1 disposed between the first boundary BL1 and the second boundary BL2 in the third direction DR3, so that the corners of the black square frame displayed in the buffer area BA may be removed. Accordingly, the visibility at the boundary between the normal area NA and the private area PA in the third direction DR3 may be reduced.

When the input grayscale values IGV of the first sub-pixels and the second sub-pixels, respectively, are the same as each other, the output grayscale value OGV applied to the first sub-pixels and the second sub-pixels disposed in the buffer area BA may be less than the output grayscale value OGV applied to the first sub-pixels disposed in the normal area NA and the output grayscale value OGV applied to the second sub-pixels disposed in the private area PA. Even though the input grayscale values IGV of the first sub-pixels and the second sub-pixels, respectively, are the same as each other, the first sub-pixels and the second sub-pixels disposed in the buffer area BA may emit light with a luminance lower than a luminance of light emitted from the first sub-pixels disposed in the normal area NA and the second sub-pixels disposed in the private area PA. Accordingly, the visibility at the boundary between the normal area NA and the private area PA may be reduced.

Although FIGS. 5 to 12 illustrate an embodiment in which the controller 150 generates the output image data IMD2 by sequentially rendering the input image data IMD1 in the order of the first stage, the second stage, the third stage, and the fourth stage, the disclosure is not limited thereto. In another embodiment, the controller 150 may generate the output image data IMD2 by sequentially rendering the input image data IMD1 in a different order from the order illustrated in FIGS. 5 to 12, or may generate the output image data IMD2 by simultaneously rendering the input image data IMD1.

Figure 13:
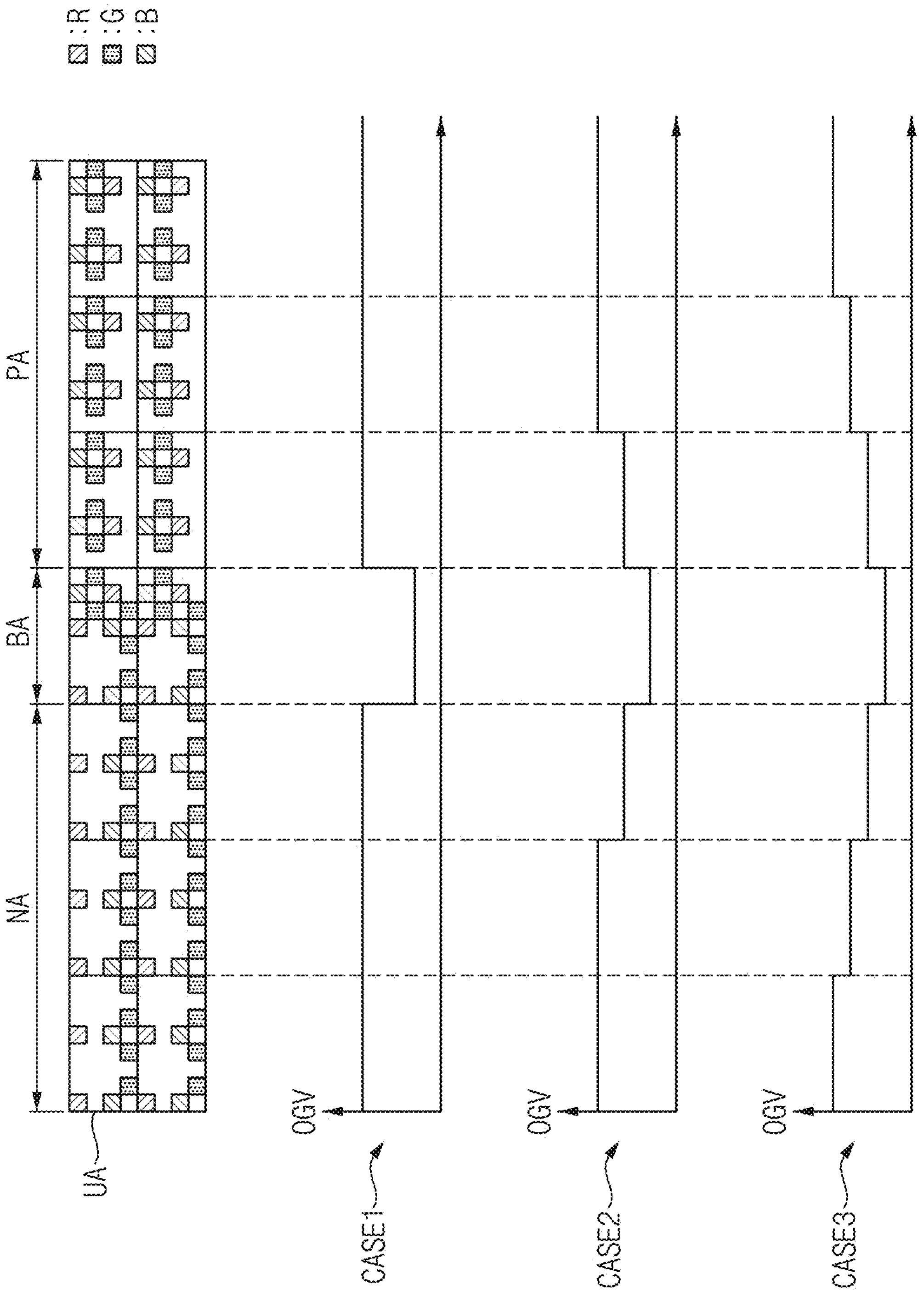
FIG. 13 is a diagram illustrating an embodiment of output image data.

FIG. 13 is a diagram illustrating an embodiment of output image data IMD2. FIG. 13 illustrates sub-pixels to which output grayscale values OGV are applied among an entirety of sub-pixels.

Referring to FIGS. 1, 2, and 13, in an embodiment, when the input grayscale values IGV of the first sub-pixels and the second sub-pixels, respectively, are the same as each other, the output grayscale value OGV applied to the first sub-pixels disposed in the normal area NA and the output grayscale value OGV applied to the second sub-pixels disposed in the private area PA may be the same as each other. In a first case CASE1, when the input grayscale values IGV of the first sub-pixels and the second sub-pixels, respectively, are the same as each other, the output grayscale value OGV applied to the first sub-pixels and the second sub-pixels disposed in the buffer area BA may be less than the output grayscale values OGV applied to the first sub-pixels disposed in the normal area NA and the second sub-pixels disposed in the private area PA. Accordingly, in the first case CASE1, a luminance of the buffer area BA may be lower than a luminance of the normal area NA and the private area PA.

In an embodiment, when the input grayscale values IGV of the first sub-pixels and the second sub-pixels, respectively, are the same as each other, the output grayscale value OGV applied to the first sub-pixels disposed in the normal area NA and the second sub-pixels disposed in the private area PA may decrease toward the buffer area BA. In a second case CASE2, when the input grayscale values IGV of the first sub-pixels and the second sub-pixels, respectively, are the same as each other, the output grayscale value OGV applied to the first sub-pixels disposed in a unit area UA next (adjacent) to the buffer area BA among an entirety of first sub-pixels disposed in the normal area NA and the second sub-pixels disposed in a unit area UA next (adjacent) to the buffer area BA among an entirety of second sub-pixels disposed in the private area PA may be less than the output grayscale value OGV applied to the first sub-pixels disposed in a unit area UA spaced apart from the buffer area BA among the entirety of the first sub-pixels disposed in the normal area NA and the second sub-pixels disposed in a unit area UA spaced apart from the buffer area BA among the entirety of the second sub-pixels disposed in the private area PA, and may be greater than the output grayscale value OGV applied to the first sub-pixels and the second sub-pixels disposed in the buffer area BA. Accordingly, in the second case CASE2, abrupt changes in luminance between the normal area NA and the buffer area BA and between the private area PA and the buffer area BA may be prevented.

In a third case CASE3, when the input grayscale values IGV of the first sub-pixels and the second sub-pixels, respectively, are the same as each other, the output grayscale value OGV applied to the first sub-pixels disposed in the normal area NA may sequentially decrease by unit area UA in a direction from the normal area NA toward the buffer area BA, and the output grayscale value OGV applied to the second sub-pixels disposed in the private area PA may sequentially decrease by unit area UA in a direction from the private area PA toward the buffer area BA. Accordingly, in the third case CASE3, the luminance may change smoothly between the normal area NA and the buffer area BA and between the private area PA and the buffer area BA.

Figure 14:
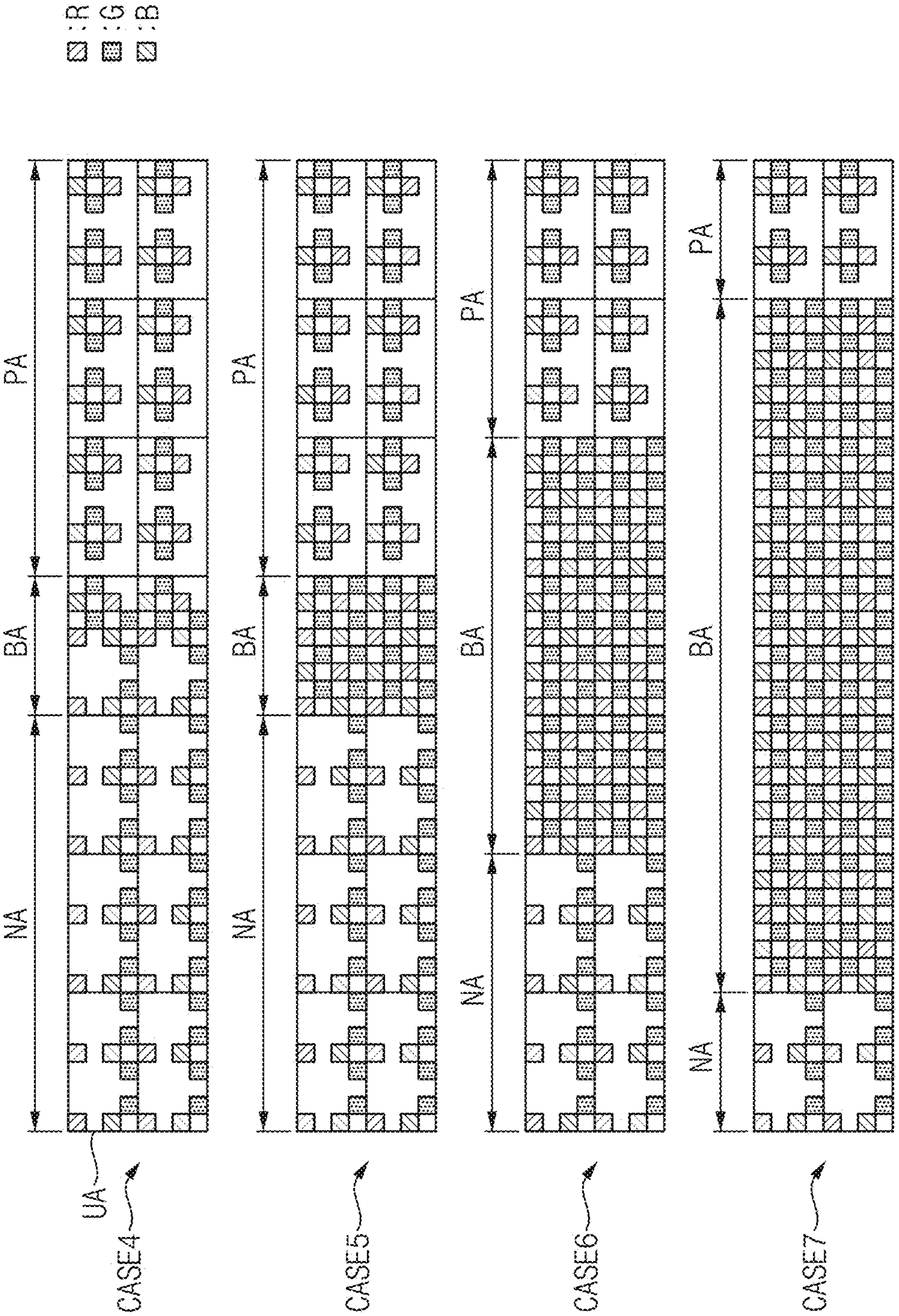
FIG. 14 is a diagram illustrating an embodiment of output image data.

FIG. 14 is a diagram illustrating an embodiment of output image data IMD2. FIG. 14 illustrates sub-pixels to which output grayscale values OGV are applied among the entirety of the sub-pixels.

Referring to FIGS. 1, 2, and 14, in an embodiment, the output grayscale value OGV may not be applied to some sub-pixels among an entirety of first sub-pixels and an entirety of second sub-pixels disposed in the buffer area BA. In a fourth case CASE4, the output grayscale value OGV may not be applied to one green sub-pixel G among eight first sub-pixels disposed in a unit area UA within the buffer area BA, and one red sub-pixel R, two green sub-pixels G, and one blue sub-pixel B among eight second sub-pixels disposed in the unit area UA within the buffer area BA.

In an embodiment, the output grayscale value OGV may be applied to the entirety of the first sub-pixels and the entirety of the second sub-pixels disposed in the buffer area BA. In a fifth case CASE5, the output grayscale value OGV may be applied to the entirety of the first sub-pixels and the entirety of the second sub-pixels disposed in the buffer area BA including one unit area UA in the horizontal direction. In a sixth case CASE6, the output grayscale value OGV may be applied to the entirety of the first sub-pixels and the entirety of the second sub-pixels disposed in the buffer area BA including three unit areas UA in the horizontal direction. In a seventh case CASE7, the output grayscale value OGV may be applied to the entirety of the first sub-pixels and the entirety of the second sub-pixels disposed in the buffer area BA including five unit areas UA in the horizontal direction. In the fifth case CASE5, the sixth case CASE6, and the seventh case CASE7, the output grayscale value OGV applied to the entirety of the first sub-pixels disposed in the buffer area BA may sequentially decrease in a direction from the normal area NA toward the buffer area BA, and the output grayscale value OGV applied to the entirety of the second sub-pixels disposed in the buffer area BA may sequentially decrease in a direction from the private area PA toward the buffer area BA. Accordingly, in the fifth case CASE5, the sixth case CASE6, and the seventh case CASE7, the luminance may smoothly change between the normal area NA and the buffer area BA and between the private area PA and the buffer area BA.

Figure 15:
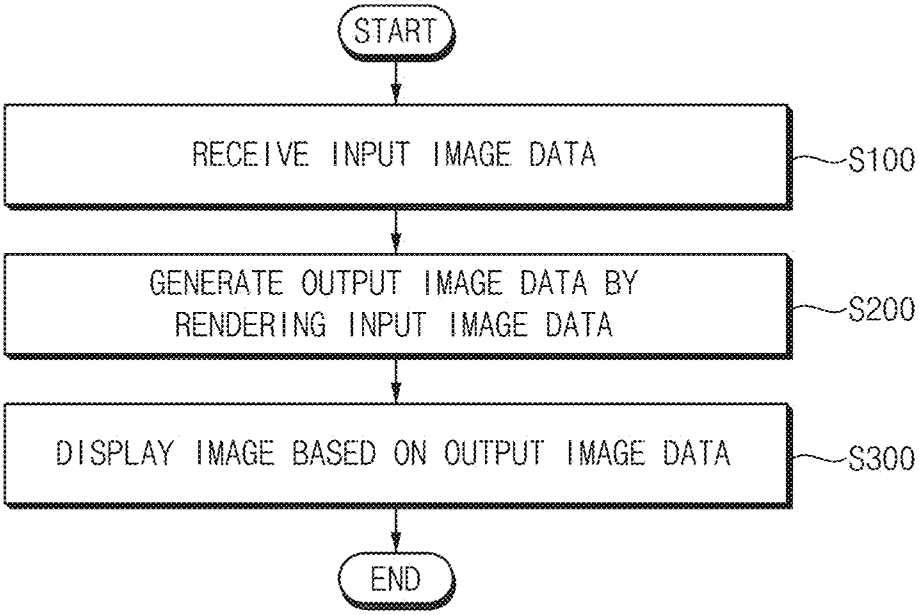
FIG. 15 is a flowchart illustrating an embodiment of a method of driving a display device.

FIG. 15 is a flowchart illustrating an embodiment of a method of driving a display device.

Referring to FIGS. 1, 2, and 5 to 15, in the method of driving the display device 100, the controller 150 may receive the input image data IMD1 (S100). The input image data IMD1 may include the input grayscale values IGV corresponding to sub-pixels of the display panel 110.

The controller 150 may generate the output image data IMD2 by rendering the input image data IMD1 (S200). The output image data IMD2 may include the output grayscale values OGV applied to the sub-pixels of the display panel 110. In the normal area NA, the output grayscale value OGV may be applied only to the first sub-pixels having the first viewing angle. In the private area PA, the output grayscale value OGV may be applied only to the second sub-pixels having the second viewing angle. In the buffer area BA between the normal area NA and the private area PA, the output grayscale value OGV may be applied to the first sub-pixels and the second sub-pixels.

As illustrated in FIG. 5, the output grayscale value OGV may be applied to an entirety of first sub-pixels included in each of the first pixels PX1 next (adjacent) to the first boundary BL1 between the normal area NA and the buffer area BA, and the output grayscale value OGV may be applied to an entirety of second sub-pixels included in each of the second pixels PX2 next (adjacent) to the second boundary BL2 between the private area PA and the buffer area BA. As illustrated in FIG. 7, the output grayscale value OGV may be applied to an entirety of first sub-pixels included in each of the first pixels PX1 disposed between the first boundary BL1 and the second boundary BL2 in the first direction DR1. As illustrated in FIG. 9, the output grayscale value OGV may be applied to an entirety of first sub-pixels included in each of the first pixels PX1 disposed between the first boundary BL1 and the second boundary BL2 in the second direction DR2. As illustrated in FIG. 11, the output grayscale value OGV may be applied to an entirety of first sub-pixels included in each of the first pixels PX1 disposed between the first boundary BL1 and the second boundary BL2 in the third direction Dr3.

When the input grayscale values IGV of the first sub-pixels and the second sub-pixels, respectively, are the same as each other, the output grayscale value OGV applied to the first sub-pixels and the second sub-pixels disposed in the buffer area BA may be less than the output grayscale value OGV applied to the first sub-pixels disposed in the normal area NA and the output grayscale values OGV applied to the second sub-pixels disposed in the private area PA.

In an embodiment, as in the first case CASE1 of FIG. 13, when the input grayscale values IGV of the first sub-pixels and the second sub-pixels, respectively, are the same as each other, the output grayscale value OGV applied to the first sub-pixels disposed in the normal area NA and the output grayscale value OGV applied to the second sub-pixels disposed in the private area PA may be the same as each other, and the output grayscale value OGV applied to the first sub-pixels and the second sub-pixels disposed in the buffer area BA may be less than the output grayscale value OGV applied to the first sub-pixels disposed in the normal area NA and the second sub-pixels disposed in the private area PA.

In an embodiment, as in the second case CASE2 and the third case CASE3 of FIG. 13, when the input grayscale values IGV of the first sub-pixels and the second sub-pixels, respectively, are the same as each other, the output grayscale value OGV applied to the first sub-pixels disposed in the normal area NA and the second sub-pixels disposed in the private area PA may decrease toward the buffer area BA.

In an embodiment, as in the fourth case CASE4 of FIG. 14, the output grayscale value OGV may not be applied to some sub-pixels among the first sub-pixels and the second sub-pixels disposed in the buffer area BA.

In an embodiment, as in the fifth case CASE5, the sixth case CASE6, and the seventh case CASE7 of FIG. 14, the output grayscale value OGV may be applied to an entirety of first sub-pixels and an entirety of second sub-pixels disposed in the buffer area BA.

The display device 100 may display an image based on the output image data IMD2 (S300).

Figure 16:
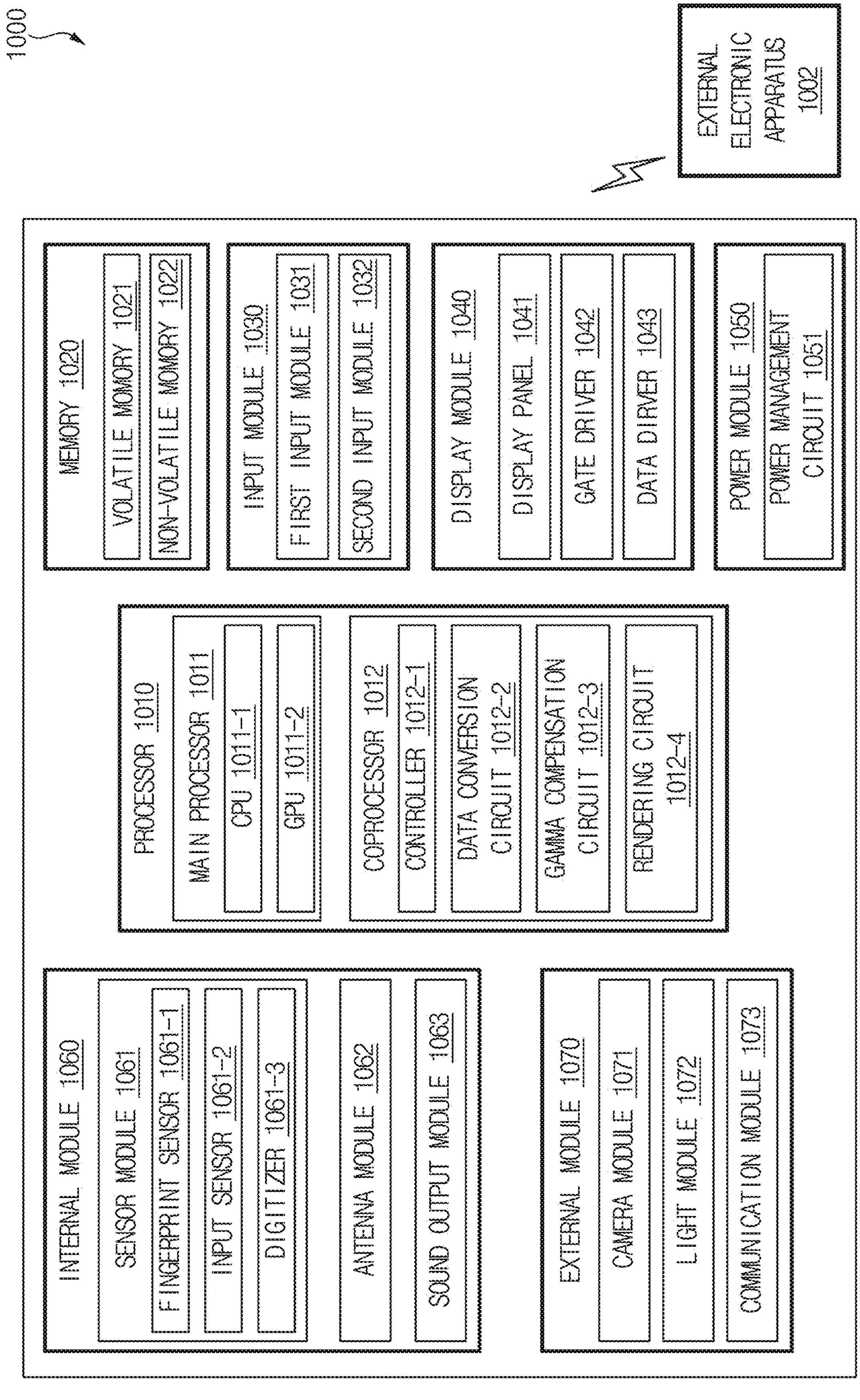
FIG. 16 is a block diagram illustrating an embodiment of an electronic apparatus.

FIG. 16 is a block diagram illustrating an embodiment of an electronic apparatus 1000.

Referring to FIG. 16, the electronic apparatus 1000 may output various information through a display module 1040 within operating system. When a processor 1010 executes an application stored in a memory 1020, the display module 1040 may provide application information to a user through a display panel 1041. In an embodiment, the processor 1010 may provide the input image data IMD1 of FIG. 1 and the control signal CONT of FIG. 1 to the display module 1040.

The processor 1010 may obtain an external input through an input module 1030 or a sensor module 1061, and may execute an application corresponding to the external input. In an embodiment, when the user selects a camera icon displayed on the display panel 1041, the processor 1010 may obtain a user input through an input sensor 1061-2, and may activate a camera module 1071, for example. The processor 1010 may transmit image data corresponding to a captured image acquired through the camera module 1071 to the display module 1040. The display module 1040 may display an image corresponding to the captured image through the display panel 1041. Some of components of the electronic apparatus 1000 may be integrated and provided as one component, or one component may be provided separately into two or more components.

The electronic apparatus 1000 may communicate with an external electronic apparatus 1002 through a network (e.g., a short-range wireless communication network or a long-range wireless communication network). In an embodiment, the electronic apparatus 1000 may include the processor 1010, the memory 1020, the input module 1030, the display module 1040, a power module 1050, an internal module 1060, and an external module 1070. In an embodiment, the electronic apparatus 1000 may omit at least one of the above-described components, or one or more other components may be added. In an embodiment, some of the above-described components (e.g., a sensor module 1061, an antenna module 1062, or a sound output module 1063) may be integrated into another component (e.g., the display module 1040).

The processor 1010 may execute software to control at least one other component (e.g., hardware or software component) of the electronic apparatus 1000 connected to the processor 1010, and may perform various data processing or calculation. In an embodiment, as at least part of data processing or calculation, the processor 1010 may store commands or data received from another component (e.g., the input module 1030, the sensor module 1061, or a communication module 1073) in a volatile memory 1021, may process the commands or data stored in the volatile memory 1021, and may store resultant data in a non-volatile memory 1022.

The processor 1010 may include a main processor 1011 and a coprocessor 1012. The main processor 1011 may include one or more of a central processing unit ("CPU") 1011-1 or an application processor ("AP"). The main processor 1011 may further include one or more of a graphics processing unit ("GPU") 1011-2, a communication processor ("CP"), and an image signal processor ("ISP"). At least two of the above-described processing unit and processor may be implemented as an integrated component (e.g., a single chip), or each may be implemented as an independent component (e.g., a plurality of chips).

The coprocessor 1012 may include a controller 1012-1. The controller 1012-1 may include an interface conversion circuit and a timing control circuit. The controller 1012-1 may receive an image signal from the main processor 1011, may convert data format of the image signal to suit the interface specifications with the display module 1040, and may output image data. The controller 1012-1 may output various control signals desired for driving the display module 1040.

The coprocessor 1012 may further include a data conversion circuit 1012-2, a gamma correction circuit 1012-3, a rendering circuit 1012-4, etc. The data conversion circuit 1012-2 may receive the image data from the controller 1012-1, and may compensate the image data such that the image is displayed at a desired luminance according to the characteristics of the electronic apparatus 1000 or the user's settings or may convert the image data to reduce power consumption or compensate for afterimages. The gamma correction circuit 1012-3 may convert the image data or a gamma reference voltage such that an image displayed on the electronic apparatus 1000 has desired gamma characteristics. The rendering circuit 1012-4 may receive the image data from the controller 1012-1, and may render the image data by considering a pixel arrangement of the display panel 1041 applied to the electronic apparatus 1000. At least one of the data conversion circuit 1012-2, the gamma correction circuit 1012-3, and the rendering circuit 1012-4 may be integrated into another component (e.g., the main processor 1011 or a controller). At least one of the data conversion circuit 1012-2, the gamma correction circuit 1012-3, and the rendering circuit 1012-4 may be integrated into a data driver 1043 to be described below.

The memory 1020 may store various data used by at least one component of the electronic apparatus 1000 (e.g., the processor 1010 or the sensor module 1061) and input data or output data for commands related thereto. The memory 1020 may include at least one of the volatile memory 1021 and the non-volatile memory 1022.

The input module 1030 may receive commands or data to be used in components of the electronic apparatus 1000 (e.g., the processor 1010, the sensor module 1061, or the sound output module 1063) from the outside of the electronic apparatus 1000 (e.g., the user or the external electronic apparatus 1002).

The input module 1030 may include a first input module 1031 through which commands or data are input from the user, and a second input module 1032 through which command or data are input from the external electronic apparatus 1002. The first input module 1031 may include a microphone, a mouse, a keyboard, a key (e.g., button), or a pen (e.g., passive pen or active pen). The second input module 1032 may support a designated protocol that may connect to the external electronic apparatus 1002 by wire or wirelessly. In an embodiment, the second input module 1032 may include a high definition multimedia interface ("HDMI"), a universal serial bus ("USB") interface, a secure digital ("SD") card interface, or an audio interface. The second input module 1032 may include a connector that may be physically connected to the external electronic apparatus 1002, e.g., an HDMI connector, a USB connector, an SD card connector, or an audio connector (e.g., a headphone connector).

The display module 1040 may provide visual information to the user. The display module 1040 may include the display panel 1041, a gate driver 1042, and the data driver 1043. The display module 1040 may further include a window, a chassis, and a bracket to protect the display panel 1041. The display module 1040 may correspond to the display device 100 of FIG. 1. The display panel 1041 may correspond to the display panel 110 of FIG. 1, the gate driver 1042 may correspond to the gate driver 120 and/or the emission driver 130 of FIG. 1, and the data driver 1043 may correspond to the data driver 140 of FIG. 1.

The power module 1050 may supply power to components of the electronic apparatus 1000. The power module 1050 may include a battery that charges power voltage. The battery may include a non-rechargeable primary cell, a rechargeable secondary cell, or a fuel cell. The power module 1050 may include a power management circuit 1051. The power management circuit 1051 may supply optimized power to each of the above-described modules and the modules described below. The power module 1050 may include a wireless power transmission/reception member electrically connected to the battery. The wireless power transmission/reception member may include a plurality of coil-shaped antenna radiators.

The electronic apparatus 1000 may further include the internal module 1060 and the external module 1070. The internal module 1060 may include the sensor module 1061, the antenna module 1062, and the sound output module 1063. The external module 1070 may include the camera module 1071, a light module 1072, and a communication module 1073.

The sensor module 1061 may detect an input by the user's body or an input by the pen among the first input module 1031, and may generate an electrical signal or a data value corresponding to the input. The sensor module 1061 may include at least one of a fingerprint sensor 1061-1, an input sensor 1061-2, and a digitizer 1061-3.

The processor 1010 may output commands or data to the display module 1040, the sound output module 1063, the camera module 1071, or the light module 1072 based on the input data received from the input module 1030. In an embodiment, the processor 1010 may generate image data in response to input data applied through the mouse or the active pen and output the image data to the display module 1040, or may generate command data in response to the input data to output the command data to the camera module 1071 or the light module 1072, for example. When no input data is received from the input module 1030 for a predetermined period of time, the processor 1010 may switch an operation mode of the electronic apparatus 1000 to a low-power mode or a sleep mode to reduce power consumption of the electronic apparatus 1000.

The processor 1010 may output commands or data to the display module 1040, the sound output module 1063, the camera module 1071, or the light module 1072 based on sensing data received from the sensor module 1061. In an embodiment, the processor 1010 may compare authentication data authorized by the fingerprint sensor 1061-1 with authentication data stored in the memory 1020, and then may execute an application according to the comparison result, for example. The processor 1010 may execute command or output corresponding image data to the display module 1040 based on sensing data detected by the input sensor 1061-2 or the digitizer 1061-3. When the sensor module 1061 includes a temperature sensor, the processor 1010 may receive temperature data for a temperature measured from the sensor module 1061, and may further perform luminance correction for the image data or the like based on the temperature data.

The display device in the embodiments may be applied to a display device included in a computer, a notebook, a mobile phone, a smart phone, a smart pad, a smart watch, a portable media player ("PMP"), a personal digital assistance ("PDA"), a motion pictures expert group audio layer III ("MP3") player, or the like.

Although the display device, the method of driving the display device, and the electronic apparatus in the embodiments have been described with reference to the drawings, the illustrated embodiments are examples, and may be modified and changed by a person having ordinary knowledge in the relevant technical field without departing from the technical spirit described in the following claims.

What is claimed is:

1. A display device comprising:

a display panel including first pixels including first sub-pixels having a first viewing angle and second pixels including second sub-pixels having a second viewing angle narrower than the first viewing angle; and a controller which generates output image data including output grayscale values respectively applied to the first and second sub-pixels of the display panel by rendering input image data including input grayscale values, wherein:

an output grayscale value of the output grayscale values is applied to only a first sub-pixel in a anormal area among the first sub-pixels, an output grayscale value of the output grayscale values is applied to only a second sub-pixel in a private area among the second sub-pixels, an output grayscale value of the output grayscale values is applied to a first sub-pixel and a second sub-pixel in a buffer area between the normal area and the private area among the first sub-pixels and the second sub-pixels, and in a state in which the input grayscale values of the first sub-pixels and the second sub-pixels, respectively, are identical to each other, the output grayscale value applied to the first sub-pixel and the second sub-pixel disposed in the buffer area is less than the output grayscale value applied to the first sub-pixel disposed in the normal area and the output grayscale value applied to the second sub-pixel disposed in the private area.

2. The display device of claim 1, wherein:

the output grayscale value is applied to an entirety of first sub-pixels included in the first pixels next to a first boundary between the normal area and the buffer area, and the output grayscale value is applied to an entirety of second sub-pixels included in the second pixels next to a second boundary between the private area and the buffer area.

3. The display device of claim 2, wherein the output grayscale value is applied to the entirety of first sub-pixels included in the first pixels disposed between the first boundary and the second boundary in a first direction.

4. The display device of claim 3, wherein the output grayscale value is applied to the entirety of first sub-pixels included in the first pixels disposed between the first boundary and the second boundary in a second direction perpendicular to the first direction.

5. The display device of claim 4, wherein the output grayscale value is applied to the entirety of first sub-pixels included in the first pixels disposed between the first boundary and the second boundary in a third direction between the first direction and the second direction.

6. The display device of claim 1, wherein, in the state in which the input grayscale values of the first sub-pixels and the second sub-pixels, respectively, are identical to each other, the output grayscale value applied to the first sub-pixel disposed in the normal area and the output grayscale value applied to the second sub-pixel disposed in the private area are identical to each other.

7. The display device of claim 1, wherein, in the state in which the input grayscale values of the first sub-pixels and the second sub-pixels, respectively, are identical to each other, the output grayscale value applied to the first sub-pixel disposed in the normal area and the second sub-pixel disposed in the private area decreases toward the buffer area.

8. The display device of claim 1, wherein the output grayscale value is not applied to some sub-pixels among an entirety of first sub-pixels and an entirety of second sub-pixels disposed in the buffer area.

9. The display device of claim 1, wherein the output grayscale value is applied to an entirety of first sub-pixels and an entirety of second sub-pixels disposed in the buffer area.

10. The display device of claim 1, wherein each of the first pixels and the second pixels includes one red sub-pixel which displays red, two green sub-pixels which display green, and one blue sub-pixel which displays blue.

11. A method of driving a display device, the method comprising:

receiving input image data including input grayscale values;

generating output image data including output grayscale values respectively applied to first sub-pixels and second sub-pixels of a display panel by rendering the input image data in a manner in which an output grayscale value of the output grayscale values is applied to only a first sub-pixel included in first pixels having a first viewing angle in a normal area among the first sub-pixels, an output grayscale value of the output grayscale values is applied to only a second sub-pixel included in second pixels having a second viewing angle narrower than the first viewing angle in a private area among the second sub-pixels, and an output grayscale value of the output grayscale values is applied to a first sub-pixel and a second sub-pixel in a buffer area between the normal area and the private area among the first and second sub-pixels; and displaying an image based on the output image data, wherein, in a state in which the input grayscale values of the first sub-pixels and the second sub-pixels, respectively, are identical to each other, the output grayscale value applied to the first sub-pixel and the second sub-pixel disposed in the buffer area is less than the output grayscale value applied to the first sub-pixel disposed in the normal area and the output grayscale value applied to the second sub-pixel disposed in the private area.

12. The method of claim 11, wherein:

the output grayscale value is applied to an entirety of first sub-pixels included in the first pixels next to a first boundary between the normal area and the buffer area, and the output grayscale value is applied to an entirety of second sub-pixels included in the second pixels next to a second boundary between the private area and the buffer area.

13. The method of claim 12, wherein the output grayscale value is applied to an entirety of first sub-pixels included in the first pixels disposed between the first boundary and the second boundary in a first direction.

14. The method of claim 13, wherein the output grayscale value is applied to the entirety of first sub-pixels included in the first pixels disposed between the first boundary and the second boundary in a second direction perpendicular to the first direction.

15. The method of claim 14, wherein the output grayscale value is applied to the entirety of first sub-pixels included in the first pixels disposed between the first boundary and the second boundary in a third direction between the first direction and the second direction.

16. The method of claim 11, wherein, in the state in which the input grayscale values of the first sub-pixels and the second sub-pixels, respectively, are identical to each other, the output grayscale value applied to the first sub-pixel disposed in the normal area and the output grayscale value applied to the second sub-pixel disposed in the private area are identical to each other.

17. The method of claim 11, wherein, in the state in which the input grayscale values of the first sub-pixels and the second sub-pixels, respectively, are identical to each other, the output grayscale value applied to the first sub-pixel disposed in the normal area and the second sub-pixel disposed in the private area decreases toward the buffer area.

18. The method of claim 11, wherein the output grayscale value is not applied to a first sub-pixel or a second sub-pixel among an entirety of first sub-pixels and an entirety of second sub-pixels disposed in the buffer area.

19. The method of claim 11, wherein the output grayscale value is applied to an entirety of first sub-pixels and an entirety of second sub-pixels disposed in the buffer area.

20. An electronic apparatus, comprising:

a processor which provides input image data including input grayscale values; and a display device which receives the input image data and displays an image, the display device comprising:

a display panel including first pixels including first sub-pixels having a first viewing angle and second pixels including second sub-pixels having a second viewing angle narrower than the first viewing angle; and a controller which generates output image data including output grayscale values applied to a sub-pixel of the display panel by rendering the input image data, an output grayscale value of the output grayscale values is applied to only a first sub-pixel in a normal area among the first sub-pixels, an output grayscale value of the output grayscale values is applied to only a second sub-pixel in a private area among the second sub-pixels, an output grayscale value of the output grayscale values is applied to a first sub-pixel and a second sub-pixel in a buffer area between the normal area and the private area among the first sub-pixels and the second sub-pixels, and wherein in a state in which the input grayscale values of the first sub-pixels and the second sub-pixels, respectively, are identical to each other, the output grayscale value applied to the first sub-pixel and the second sub-pixel disposed in the buffer area is less than the output grayscale value applied to the first sub-pixel disposed in the normal area and the output grayscale value applied to the second sub-pixel disposed in the private area.

* * * * *